United States Patent [19]
Michlin

[11] Patent Number: 6,131,261
[45] Date of Patent: Oct. 17, 2000

[54] ARBOR PRESS EXTENDER DEVICE AND METHOD

[76] Inventor: Steven Bruce Michlin, 5310 Bentley Suite 105, West Bloomfield, Mich. 48322

[21] Appl. No.: 09/109,309

[22] Filed: Jun. 30, 1998

[51] Int. Cl.[7] .................................................. B23P 19/02
[52] U.S. Cl. ................ 29/251; 29/252; 29/283.5
[58] Field of Search ............................. 29/251, 255, 252, 29/238, 239, 283.5

[56] References Cited

U.S. PATENT DOCUMENTS

| | | | |
|---|---|---|---|
| 1,128,240 | 2/1915 | Flint | 29/251 |
| 1,444,769 | 3/1923 | Dover et al. | 29/251 |
| 1,791,967 | 2/1931 | Mansfield | 29/251 |
| 1,800,566 | 4/1931 | Pabst | 29/251 |
| 2,336,262 | 12/1943 | Krasberg | 29/251 |
| 3,157,112 | 11/1964 | Truhon | 29/251 |
| 4,763,394 | 8/1988 | Decato et al. | 29/252 |
| 5,634,175 | 5/1997 | Michlin et al. | 399/90 |
| 5,878,471 | 3/1999 | Hardy | 29/251 |

*Primary Examiner*—David A. Scherbel
*Assistant Examiner*—Lee Wilson

[57] ABSTRACT

Fixtures and subfixtures may be used to hold the component being pressed for greater precision. Quick connect fixtures and subfixtures may be used in the press to save time and labor of the changeover process by using couplings and nipples attached to the fixtures and subfixtures not unlike the couplings and nipples used for quick connection and release of air compressor hoses and hydraulic line hoses.

28 Claims, 19 Drawing Sheets

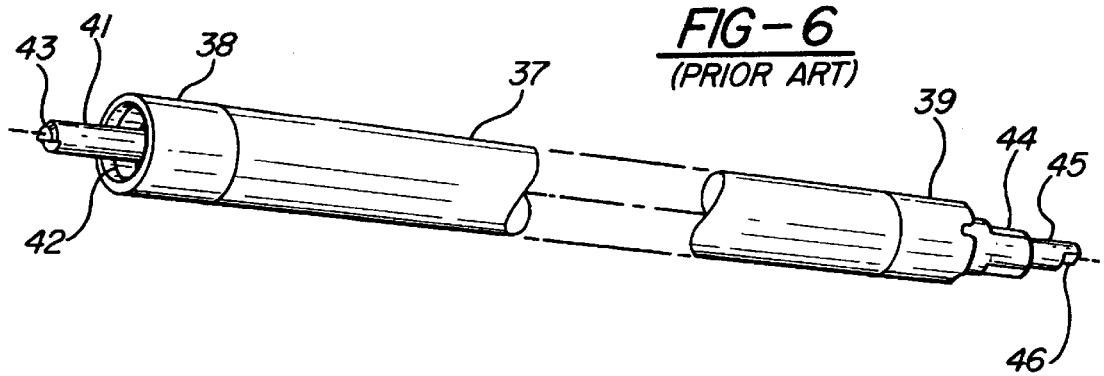
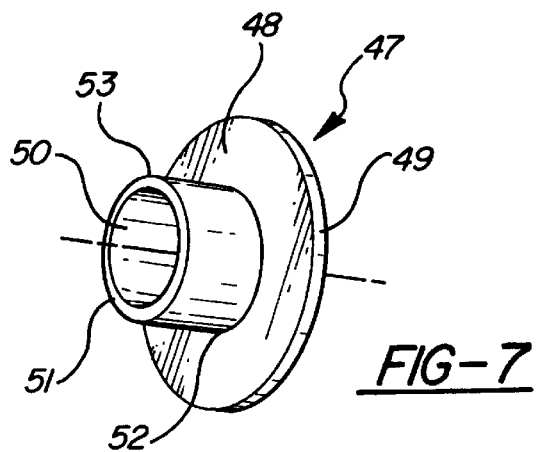
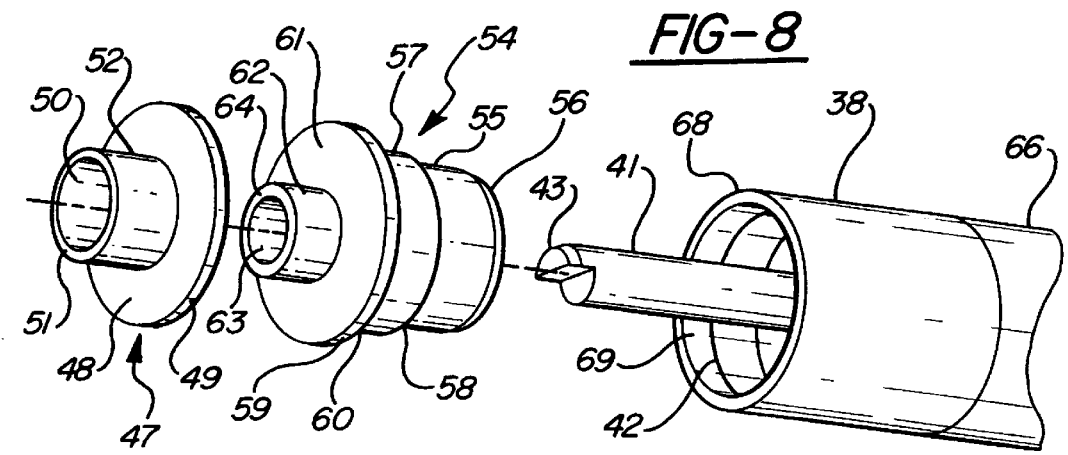

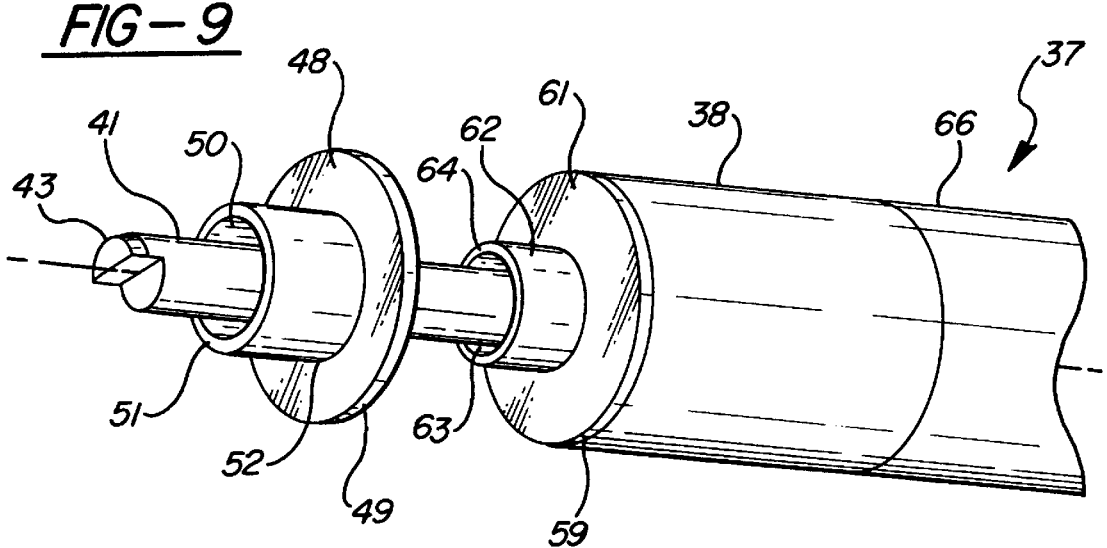
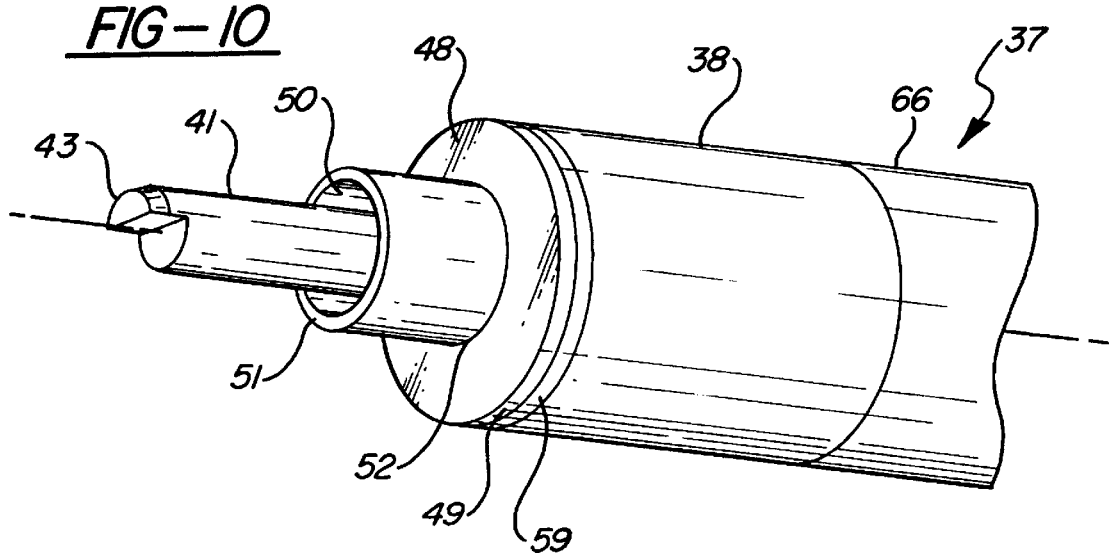

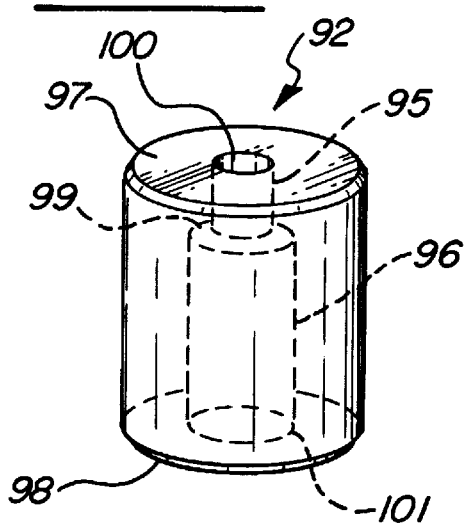
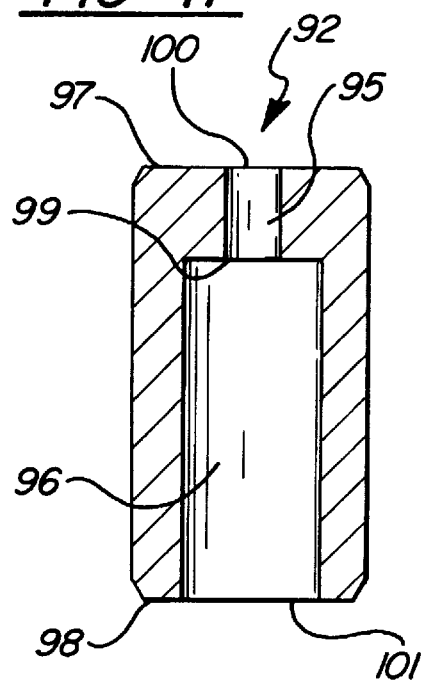
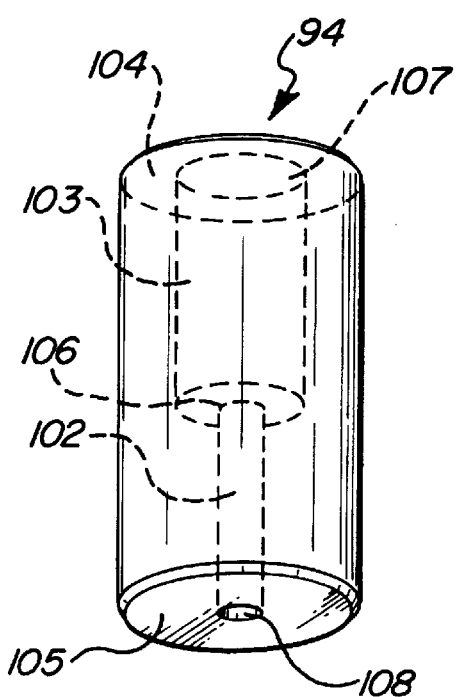
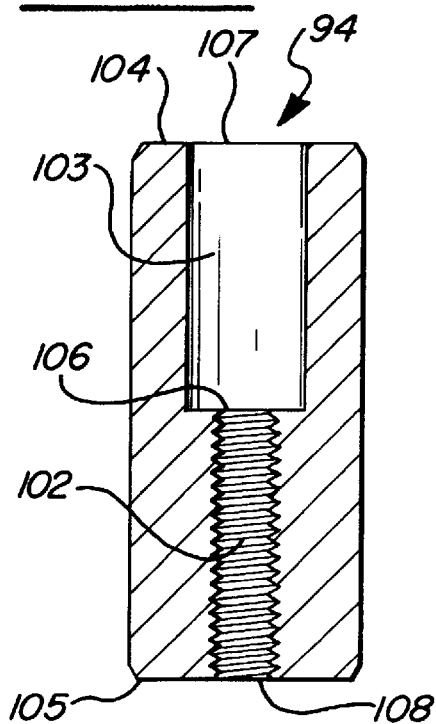

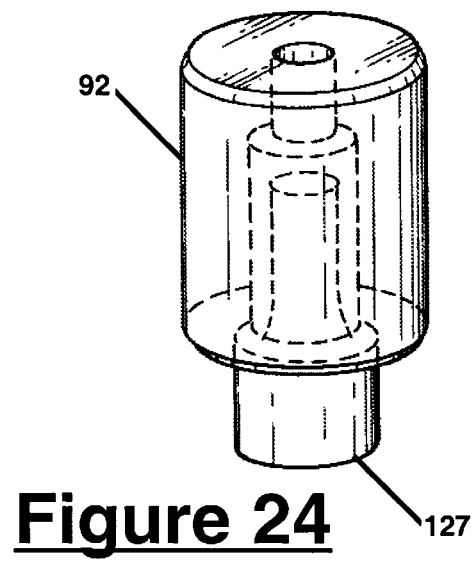
Figure 24
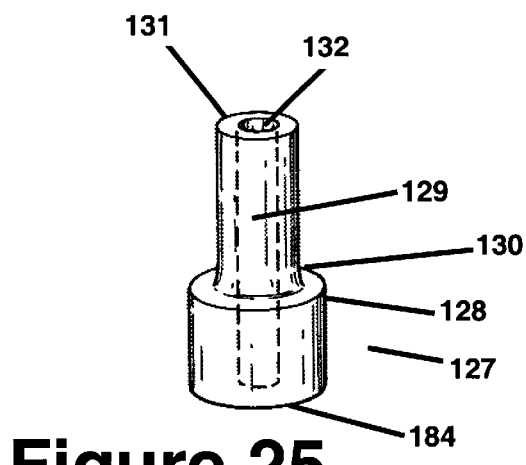
Figure 25
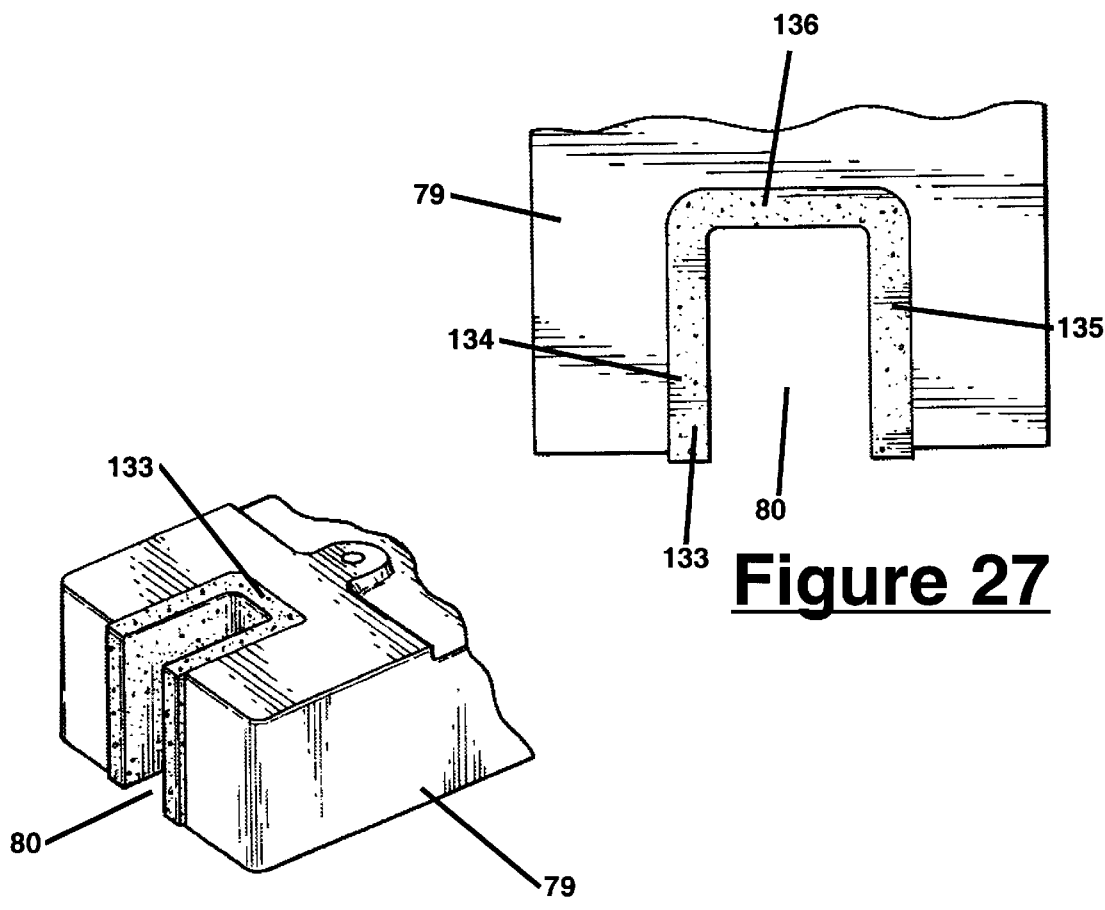
Figure 26
Figure 27

ARBOR PRESS EXTENDER DEVICE AND METHOD

BACKGROUND OF THE INVENTION

This invention relates to solving problems in Xerography and more specifically in the toner cartridge remanufacturing industry. This includes copiers, laser printers and facsimile machines which will be referred to as imaging machines. This invention also relates to the industrial machinery industry.

CANON has designed an all-in-one cartridge as seen in U.S. Pat. No. 4,975,744, issued Dec. 4, 1990 and assigned to CANON. Several companies have used these cartridges in laser printers, copy machines and facsimile machines, each with the varying printer engines and a different nameplate. Originally, these cartridges were designed to be "disposable". However, after the first all-in-one toner cartridge was introduced, it did not take long before laser cartridge remanufacturers such as myself began remanufacturing these cartridges. These "disposable" cartridges were designed to function for only one cartridge cycle without remanufacturing. The remanufacturers had found certain components that needed replacement on a regular basis. In 1990, the first aftermarket photoreceptor drum became available for use in remanufacturing the all-in-one cartridge of the "SX" engine variety, the most popular printer cartridge from around 1987 through 1993. When the long-life photoreceptor drum became available, the entire remanufacturing industry turned around and gained great strength and began a huge growth surge that still continues. In October 1993, HEWLETT-PACKARD, the largest seller of this printer engine using the all-in-one cartridge, entered the cartridge remanufacturing industry with the "Optiva" cartridge, further increasing the size as well as credibility of this relatively new industry. However, this relatively new industry grew from the all-in-one cartridge shortly after its debut. Before the introduction of the long-life drum, sometimes called the "superdrum" or "duradrum", the SX cartridge would last for around three cartridge remanufacturing cycles at best, since the actual useful life of the OEM drum was three cycles. However, the long-life drums got their names from the fact that they were designed to last for many remanufacturing cycles or recharges as they are sometimes called. Typically, the long life drum can last for ten or more such cycles, unlike the typical OEM (Original Equipment Manufacturer) drum. With the additional developments of drum coatings, originally designed for OEM drums, the long-life drum may last for many additional cycles. Some coatings, in theory, were designed to be dissolved and removed from over the drum surface every 1–3 cycles, so the drum life of the long-life drum almost seems limitless.

However, with photoreceptor drums lasting for many cycles, other components of the cartridge have a tendency to require greater durability, a better solution, or a greater life. Also, as the success of these cartridges has skyrocketed, the demand is for cartridges with longer cycles, so component improvements are significant. Therefore, avoiding natural problems with prevention means must also be implemented for cartridges of longer life both in longer cycle times and greater number of cycles. One good example is the electrical contact used in many developer rollers of toner cartridge assemblies.

Inventor was awarded U.S. Pat. Nos. 5,634,175 and 5,648,838 for electrical contacts for developer roller assemblies. To properly install an electrical contact from the above patents in the most robust way, one would want to press-fit the contact into the inner wall of the developer roller. It sounds simple. However, you can not just get an arbor press and press fit the contacts because arbor presses have a very short maximum press-fit height. Most arbor presses look alike, just that some are bigger and more powerful than the others, among the most common arbor presses. However, a ½ ton arbor press has a 4 inch height and a one ton press has a slightly larger height, a two ton press has a slightly larger height and even a 5 ton arbor press typically has a not greatly larger height. To press-fit contacts into developer rollers, most developer rollers are over ten inches long and even an expensive 5 ton arbor press, much greater in weight and power than necessary, is not long enough to press-fit all sizes of developer rollers. In another example, the WX (5Si) developer roller is over 18 inches long and would not even fit in a 5 ton arbor press in the typical case. To solve this problem, inventor has developed an arbor press extender device to lengthen the maximum press length that an arbor press may press. Thus, with this invention, even a small ½ ton arbor press may be used for press-fitting an electrical contact on a long developer roller sleeve. With the extender device of this invention, there is no limit in the maximum allowable press length that may be pressed with an arbor press, and thus, a small ½ ton arbor press with the extender device of this invention may press a part of a greater length than a large 5 ton arbor press without the extender device of this invention which saves a lot of money.

SUMMARY OF THE INVENTION

Accordingly, it is an object of this invention to show an arbor press extender device to increase the length that a press-fit may be performed.

It is a further object of this invention to show an arbor press extender with modular fixtures and fixture holders that receive each end of the developer roller including an electrical contact that may be press-fit.

It is still a further object of this invention to show an arbor press extender with fixtures that receive each end of the developer roller including an electrical contact that may be press-fit.

It is yet a further object of this invention to show modular fixtures to fit into fixture holders to allow quick change from one type of press-fit to be performed to another with minimal set-up time between press-fit styles and sizes.

It is yet a further object of this invention to show quick snap-on/snap-off fixtures and fixture holders for quick connect/quick disconnect of fixtures to fixture holders where fixtures may be held firmly in place without falling off the fixture holder using the concept used in quick connect air hose connections.

It is yet a further object of this invention to show an improved contact receiving device to improve rotational trueness of developer rollers.

It is yet a further object of this invention to show an improved contact receiving device that not only improves rotational trueness of developer rollers, but also is a link in the electrical contact's connection.

It is yet a further object of this invention to show modular fixture holders and fixtures for press fitting applications that quickly install and uninstall using air-hose quick-connect couplers and nipples.

It is yet a further object of this invention to show modular fixture holders and fixtures for press fitting applications that quickly install and uninstall using a small piece of hose in the bore of the fixture module to make a tight yet removable quick connection.

In carrying out this invention in the illustrative embodiment thereof, an arbor press is equipped with an extender device to increase the maximum allowable part length that may be pressed. This not only eliminates the need for using a larger press by allowing a smaller press to be used for pressing long parts, which also saves money, but some parts which may be too long to fit on a much larger arbor press may now be pressed on a small arbor press. Modular quick-connect / quick-disconnect fixtures may be used to fit in fixture holders for holding firm different types of parts and different styles of developer rollers which may now be press-fit using this extender device of this invention. With this extender device, even extremely long parts may be press-fit economically which opens new doors for applications using arbor presses in many industries as a result of this invention. Even an adjustable length arbor press extender may be used for variable extender length for multiple applications with one extender device.

BRIEF DESCRIPTION OF THE DRAWINGS

This invention, together with other objects, features, aspects, and advantages thereof, will be more clearly understood from the following description, considered in conjunction with the accompanying drawings.

FIG. 6 shows an isometric view of a prior art developer roller sleeve, showing the shaft and inside the contact end of the developer roller.

FIG. 7 is an isometric view of an aftermarket bushing used to receive the electrical contact which functions with the electrical contact to make electrical connection.

FIG. 8 shows an isometric view of a metal bushing for receiving the end of a developer roller that prevents wobble, trues rotation and may optionally act as a link in the electrical contact's connection, shown prior to the press-fit of the aftermarket electrical contact.

FIG. 9 shows an isometric view of a prior art developer roller sleeve end, showing the shaft, new and improved electrical contact and metal bushing after the electrical contact is press-fit in place.

FIG. 10 shows an isometric view of a prior art developer roller sleeve end, showing the shaft, new and improved electrical contact and metal bushing after the electrical contact is press-fit in place and metal bushing is in proper position.

FIG. 16 is an isometric view of an upper fixture holder.

FIG. 17 is a cutaway view of an upper fixture holder.

FIG. 18 is an isometric view of an lower fixture holder.

FIG. 19 is a cutaway view of an lower fixture holder.

FIG. 24 is an isometric view of an upper fixture holder with a male fixture module attached.

FIG. 25 is an isometric view of a male fixture module.

FIG. 26 shows a cutaway isometric view of an arbor press with foam in the arbor press opening to prevent the magnetic developer roller from getting damaged.

FIG. 27 shows a cutaway top view of an arbor press with foam in the arbor press opening to prevent the magnetic developer roller from getting damaged.

COMPLETE DESCRIPTION OF THE PREFERRED EMBODIMENT

Figure 1:
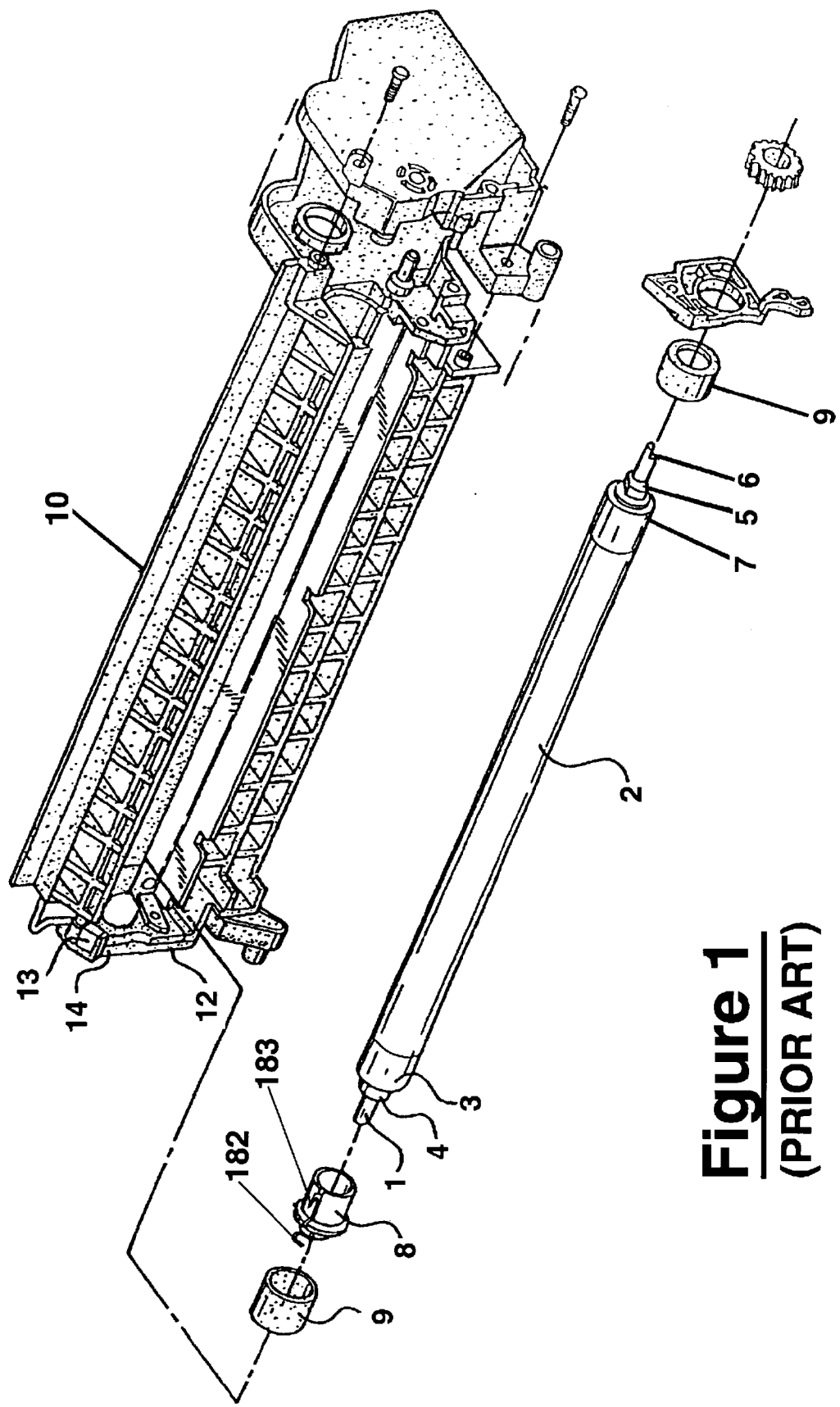
FIG. 1 is an isometric view of a prior art toner hopper assembly showing the breakdown of the developer roller and OEM electrical contacts and end fittings.

FIG. 1 is a broad illustration of the EX toner hopper 10 used in the HP LASERJET series 4 printer. The developer roller 2 has an end 3 from which the magnetic core 4 and magnetic core shaft 1 extend. The developer roller contact device 8 fits into the end 3 of the developer roller 2. A white plastic insulative bushing 9 fits over the end 3 of the roller 2 and the contact device 8. An insulative alignment piece 12 (shown in FIG. 2) with an opening aligns the entire connection relative to the metal contact plate 14 mounted on the endcap 12 of the toner hopper assembly 10 The metal contact plate 14 connects the contact device 8 with a printer contact 13, which in turn connects with the printer's electronic circuitry. The contact device 8 has a wire. At one end the wire 182 touches and makes contact with the contact plate 14. At the other end the wire 183 touches and makes electrical contact with the inner wall of the developer roller 2.

Figure 38:
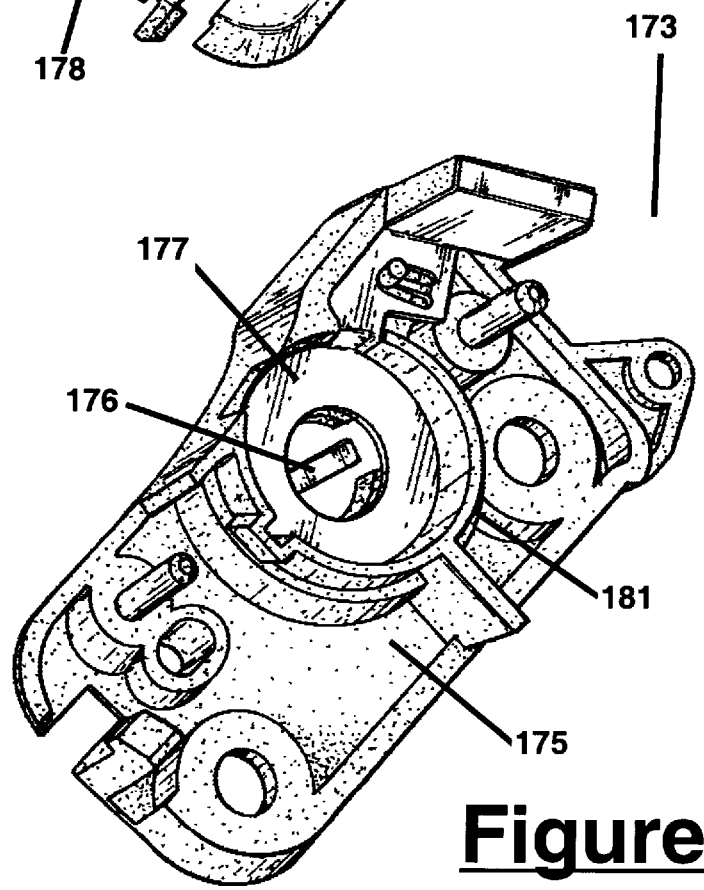
FIG. 38 shows the inside view of an endcap assembly of a developer roller assembly showing the printer contact attached to the ring contact.

This is a very poor bias voltage contact system. As a result of the poor contact, the printed image lacks quality after the spring wire 182 and 183 loses its resiliency, either where the spring wire 182 and 183 touches the contact plate 14 or where the spring wire 183 contacts the inner wall of the developer roller sleeve 2.
The spring wire is continuous from 182 where it rotates on the contact 8 and at the same time contacts the contact plate 14 to 183 where it contacts the inner wall of the developer roller sleeve 2. Alternately, the spring wire 182, 183 may get insulated either by toner or oxidation from aging, environment and extreme use. The more the contact device 8 is used, the worse the image gets. Another contributing factor is the aged and used surface of the developer roller 2. However, the wire 182, 183 deteriorates and gradually the image degrades in steps, however, when this process is combined with the conditions of the developer roller's 2 surface, it is a defective like a shotgun shooting out of two barrels at the same time with multiplying effects. However, the contact from the wire 182 to the metal contact plate 14 is poor in the first place because wire is thin and also there is not a lot of spring wire surface area to contact. There is just a small point to make contact with the ring of the endcap assembly (FIG. 38) and a small point 183 to contact the inner wall of the developer roller 2. Consequently, it is an accident waiting to happen. As the spring wire 182 and 183 loses resiliency in time, it loses its contact effectiveness. The same is true at the segment 46 where the spring wire 183 contacts the inner wall of the developer roller 2. As time passes and more print cycles are completed, the spring wire 182, 183 loses its resiliency and the integrity of the contact of the spring wire 182, 183 to the inner wall of the developer roller 2 is detrimentally affected to the point where the print quality of the image degrades.

The contact device 8, and thus the spring wire 182 and 183 rotate with the developer roller 2. So the segment 47 of the spring wire 182 moves relative to the metal contact plate 14. The mechanical motion makes the spring wire 182 even more susceptible to loss of resiliency, oxidation, dust, toner and wear.

Figure 2:
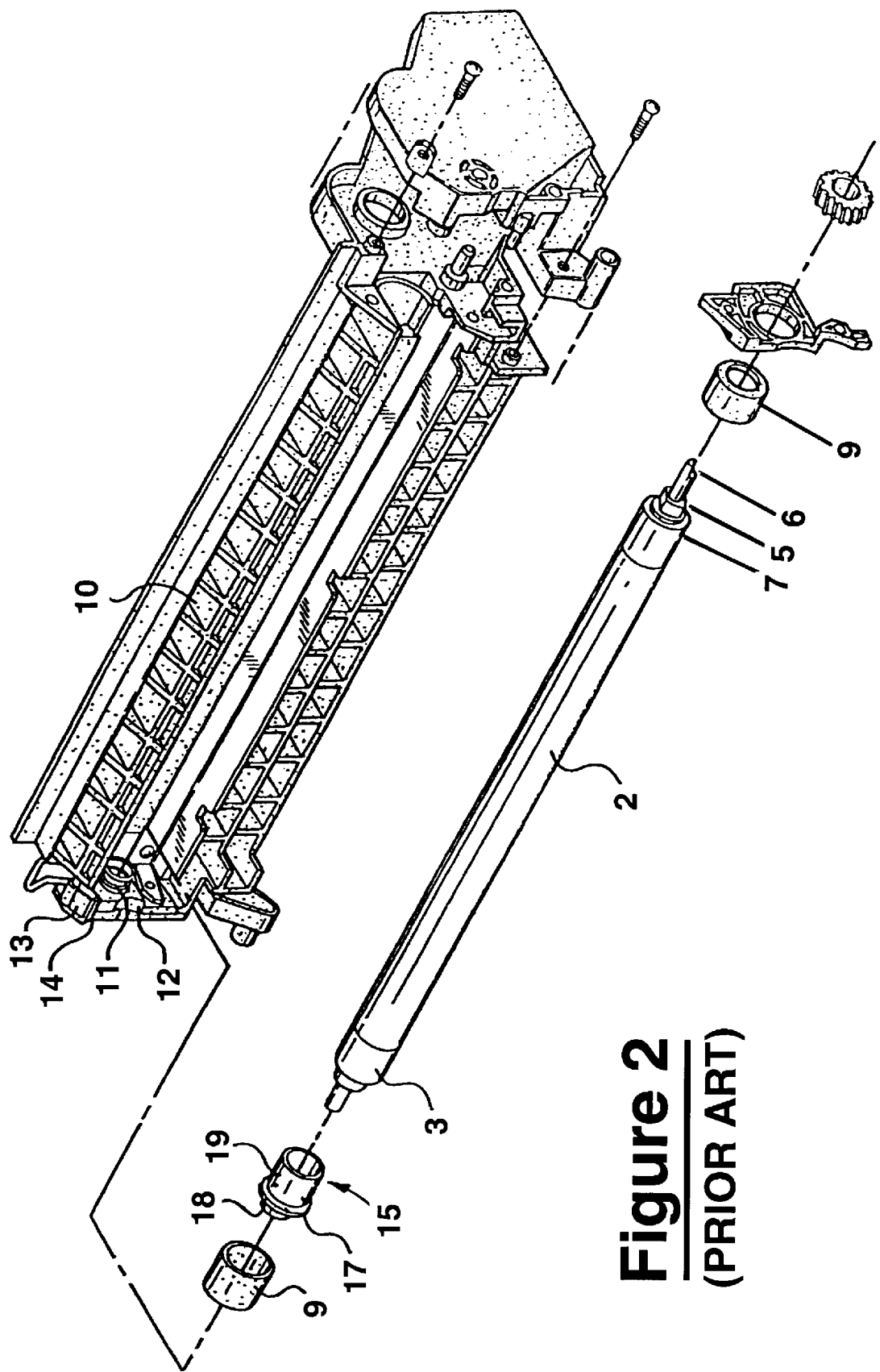
FIG. 2 is an isometric view of a prior art toner hopper assembly showing the breakdown of the developer roller and some aftermarket electrical contacts and end fittings.
Figure 3:
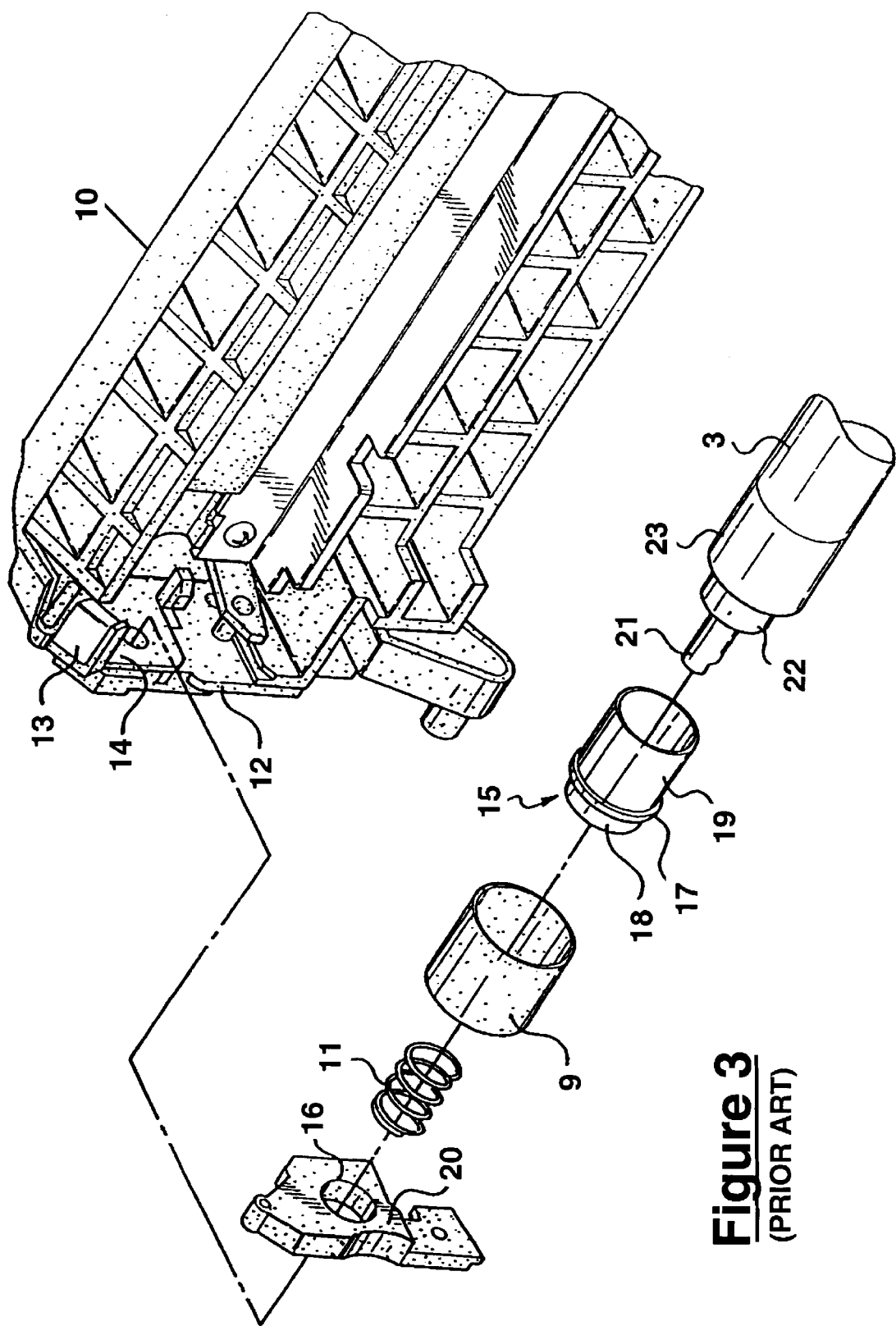
FIG. 3 is an isometric view of a prior art toner hopper assembly showing the breakdown of the developer roller and some aftermarket electrical contacts.

These problems led to the development of the devices shown in U.S. Pat. No. 5,634,175, and improvement of the contact device for use in the EX toner opper assembly 10. FIGS. 2 and 3 show the contact device 15, the first aftermarket device for the EX toner hopper. The contact device 15 comprises a metal bushing with a large diameter portion 19 sized to fit into the end 3 of the developer roller 2 where the large diameter portion 19 of the contact device 15 is completely inserted into the developer roller 2, providing additional electrical surface area between the contact device 15 and the roller 2.

FIG. 2 is a broad illustration of how the developer roller contact device 15 is connected with the toner hopper assembly 10. In one optimized design, the large diameter portion 19 is inserted into the end 3 of the roller 2, and the plastic bushing 9 is slipped over the roller end 3 and contact device 15 The small diameter portion 18 is then pressed against the coil spring 11 and into the opening 16 in the insulative alignment piece 20, and the developer roller 2 is mounted on the toner hopper assembly 10. FIG. 3 is an enlarged view of the relevant end of the toner hopper assembly 10 to more clearly illustrate the contact device 15 connection. The alignment piece 20 and coil spring 11 are shown separated from the assembly 10 for clarity. The outer surface of the large diameter portion 19 of the contact device 15 may be adhered by glue or conductive glue to the inner wall of the developer roller 2. However, for best results, a press fit would make the best electrical contact, much better than gluing the contact. Also by press-fitting the contact 15, the contact, which in this case also acts as an alignment shaft, will have a more true rotational motion.

Figure 4:
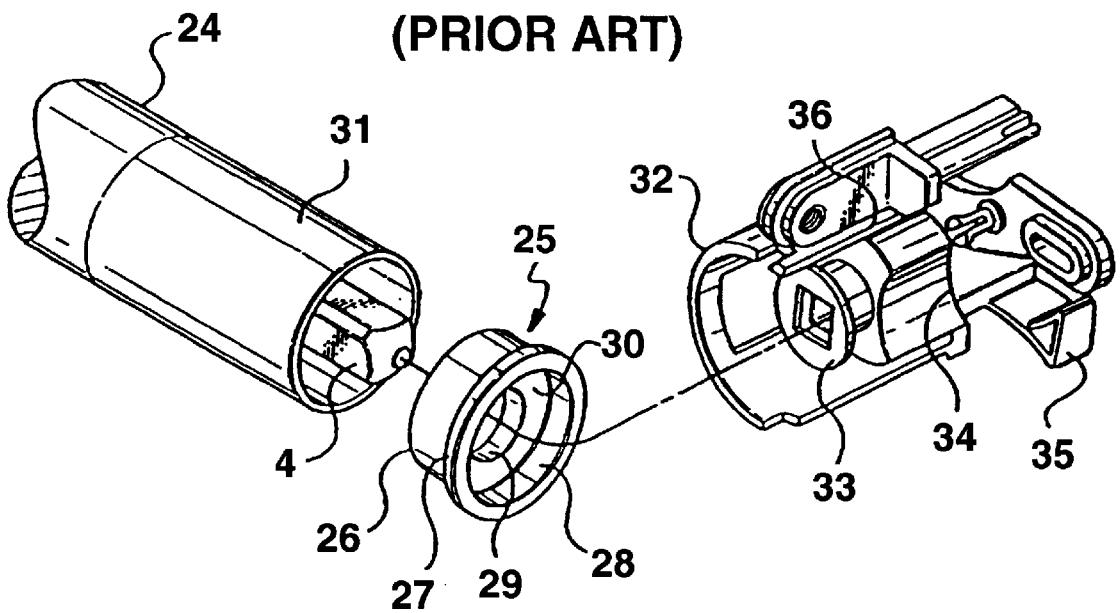
FIG. 4 is an isometric view of an end portion of a prior art toner hopper assembly showing the breakdown of the contact end of the developer roller, some aftermarket electrical contacts and the printer contact.
Figure 5:
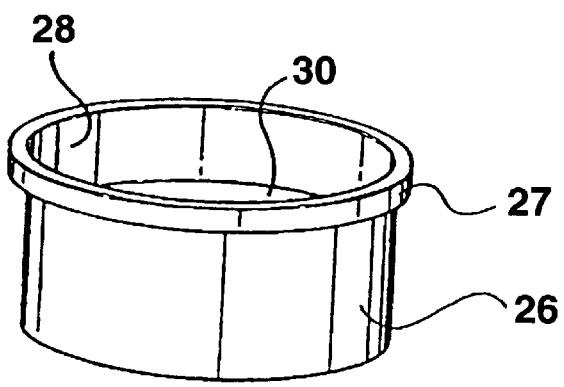
FIG. 5 is an isometric view of an aftermarket electrical contact.

FIGS. 4 and 5 show another contact device 25 from inventor's U.S. Pat. No. 5,634,175 used in the LX toner cartridge. The contact device 25 comprises a cylinderical member 26 with a rim 27. The cylinderical member 26 has an outside diameter sized to snugly fit inside the end 31 of the developer roller 1. The rim 27 is sized to abut against the end 31 of the developer roller when the cylinderical member 26 is completely inserted within the developer roller 1. The interior of the contact device 25 has two portions. The first portion 28, adjacent the rim end of the contact device 25, has an inside diameter sized to slide over the washer 33 in the printer electrical contact 36. The second portion 29 has an inside diameter sized to fit around the end of the magnetic core's shaft 4 within the developer roller 24. A contact surface 30 is formed where the interior portions 28 and 29 meet. The contact surface 30 remains 19 in contact with and rubs against the face of the washer 33 in the printer electrical contact 36 when the developer roller contact device 25 rotates with the developer roller 24.

It has been found that the developer roller contact device 25 works well, fitting by snugness without adhesive. However, it has been tested using adhesive to adhere the contact device 25 within the end 31 of the developer roller 24 and there was no ill effect. When using adhesive, one must be careful not to create an insulative layer that would prevent contact. The only purpose of glue is to prevent the contact device 25 from spinning within the developer roller sleeve 24 which would machine a groove within the roller. Conductive adhesives may be used. However, it has been found that using a press-fit contact 25 eliminates the need for glue, improves the contact and makes for a more true rotation of the developer roller sleeve 24. With the developer roller contact device 25, electrical contact with the developer roller 24 is maintained not only where the rim 27 abuts against the end 31 of the roller 24, but also where the cylindrical member 26 touches the inner wall of the roller 24.

For any such contacts, a very small amount of conductive grease should be applied wherever rotating parts make electrical contact with stationary parts and vice versa. There are two basic types of conductive greases in the aftermarket, white grease and black grease. Black grease measures conductivity with an ohmeter and white grease does not. However, white grease nonetheless performs as well even though it does not measure actual conductivity and solves the problems that conductive grease is there to solve, i.e., stability of contact, prevention of contact-loss, arc prevention and corrosion resistance. Inventor introduced the first aftermarket conductive grease to the toner cartridge remanufacturing industry in an article he wrote that was published in Recharger in 1992. Black grease has the major disadvantage that by the end of a cartridge remanufacture cycle, the black grease forms a hard layer on the outer surface and thus requires cleaning between every recharge cycle. However, hardened black grease does remain conductive when transformed to the hardened solid state. It is because of the cleaning requirement of the black grease that is a costly nuisance that has convinced inventor that the black grease is not recommended and that the white grease is. By the end of a toner cartridge cycle, the white grease is partially gone, thus sacrificially doing its job, but does not require any cleanup of components like black grease does.

It has been found that the best manufacture of such electrical contacts 15 and 25 may be made using a press-fit rather than requiring the use of a glue. Thus the tolerances must be plus and minus 0.005 inches in the typical case in dimensions that involve press fit for the EX developer roller 3. This is the tolerance available in manufacture without taking special precautions that would otherwise increase the manufacture costs of the contacts 15 and 25.

FIG. 6 shows a developer roller 37 of the HP-4000 toner cartridge. The roller has a left side 38, a right side 39, a metal shaft 41, a right side bushing 44, a right side 45 of metal shaft 41, a left and right end 43 and 46 of metal shaft 41 and an inner bore 42. It can be seen in the figure that just to the right of the inner bore 42, the bore dimension of the developer roller sleeve 37 is smaller in diameter. Thus, the inner bore 42 is a counter bore in the smaller bore to the right. It is in this inner bore 42 where the plastic OEM contact fits in the HP-4000 developer roller 37 (not shown). This OEM contact is essentially the same as the EX contact 8 shown in FIG. 1. The OEM contact 8 rotates in a plastic wearable modular receiving bore assembly not shown. The problem is that the modular receiving bore assembly made of plastic can enlarge in bore size and thus cause the developer roller 37 to have a slight wobble. This slight wobble would cause the developer roller to have chatter and appear worn prematurely. In other cases, the out-of-round modular receiving bore assembly can cause the developer roller to physically contact the metal of the magnetic endseal (not shown) that replaces the endfelts of old. When the developer roller touches the magnetic endseal, you can kiss the developer roller sleeve 37 goodbye because the metal along the side of the endseal will machine a groove into the soft aluminum developer roller sleeve 37. This is almost the same as putting the developer roller sleeve 37 on a lathe and having a metal tool cut into the aluminum tube 37.

Figure 37:
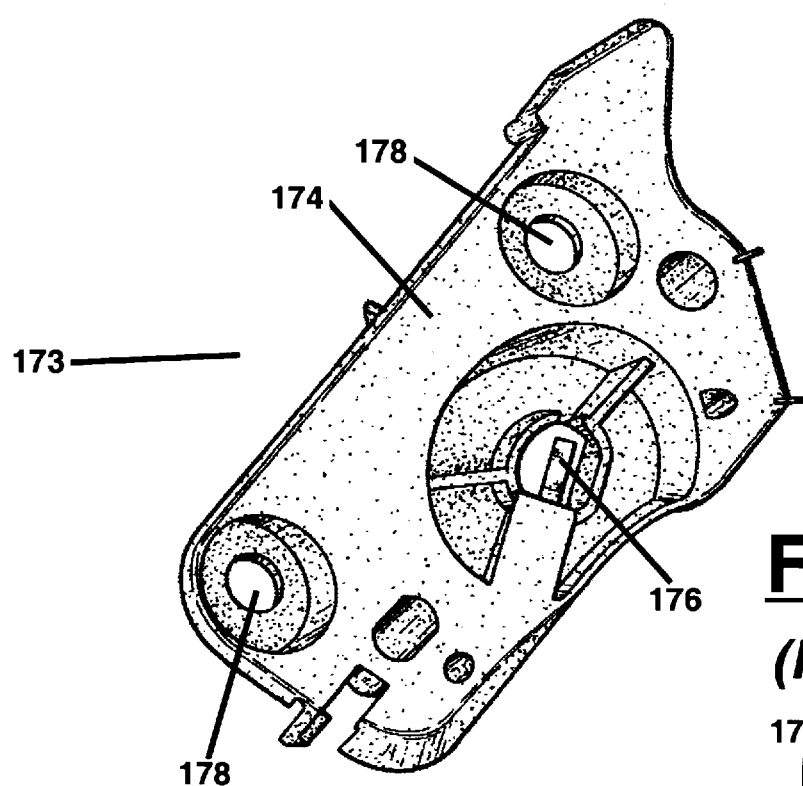
FIG. 37 shows the outside view of an endcap assembly of a developer roller assembly showing the printer contact.

FIG. 7 shows the electrobushing 47 that is designed to replace the removable all-plastic OEM receiving bore assembly. It looks similar in shape, but the electrobushing is metal or conductive plastic and the modular receiving bore assembly has different shapes on the outside for fitting into the endcap assembly 173 (FIGS. 37 and 38) with a groove to lock into the endcap assembly 173. The electrobushing 47 was made in a simpler way to decrease manufacturing costs and thus roundness is the key. However, the electrobushing was made to make contact with the left end 53 to the printer contact 173 and thus was designed a little longer in length than the OEM plastic bushing. By being a little longer the electrobushing 47 will make tighter fit of the developer roller 37 in the toner hopper, but will maintain electrical contact by being tighter. The electrobushing 47 has a rim 49, a left surface of rim 48, a bore 50, a cylinderical portion 51, a circle portion 52 where the cylindrical portion 51 joins the rim left surface 48. The endcap 173 has two holes 178, to hold it in place, a metal flat spring contact 176 which connects to a contact ring 177, all in one metal piece. The left end 53 of the electrobushing 47 is longer than the OEM's plastic bushing design so that, unlike the OEM bushing, the electrobushing left side 53 makes contact with the metal contact ring 177 for better electrical contact. The OEM plastic bushing fits inside the plastic sleeve receiving wall 181 as does the electrobushing 47.

FIG. 8 shows an exploded view of the electrobushing 47, the new contact 54 and the developer roller 66. The electrobushing 47 is designed not only to prevent the out-of-roundness of the OEM plastic bushing that can cause problems after the inner bore enlarges, but also helps the functioning of the contact 15. However, the contact 15 has been slightly improved by the contact 54 of, which is designed more optimally for a press-fit. Both contacts 15 and 54 are identical except for the two steps 55 and 57 shown on the contact 54. The contact 54 has a smaller portion 55 (the first step) on the press-fit side, a right end 56, a larger portion 57 (the second step) of the press-fit cylindrical portion, a joining portion 58 where the larger portion 57 joins the smaller portion 55, a rim 59, a second joining portion 60 where the rim 59 joins the larger portion 57, s flat 61 surface of rim 59, an alignment portion 62, a bore 63 in the alignment portion, and an end surface 64 in the alignment portion 62. The press-fit contact 54 has a second bore (not shown) through the smaller portion 55 and the larger portion 57 that is larger than the diameter of the magnetic core (not shown) on the shaft 41. The press-fit contact 54 is to be press-fit onto the developer roller sleeve 66 which has an inner bore 42, a left rim 68, and a counter bore portion 69 of the inner bore 42.

FIG. 9 is an exploded view of the electrobushing 47 with respect to the developer roller sleeve 66 with the contact 54 already press-fit into the developer roller 66. FIG. 10 shows the same as FIG. 9 with everything in place including the electrobushing 47. The press-fit of the contact 54 may be done with a hammer. However, by hammering the contact 54 into the inner bore 42 of the developer roller sleeve 66 may cause problems. For example, the contact, made of steel, brass or bronze can cause score and scratch marks into the inner bore 42 of the developer roller sleeve 66 and can cause out-of-roundness of the developer roller sleeve 66. Thus, it is a good idea to press-fit the parts with a press instead of a hammer. The least costly and common presses used for press-fits are arbor presses. They are used by mechanics in garages to press-fit bearings and other mechanical fittings that require a press-fit. With an arbor press, a tremendous amount of pressure may be exerted with a very small exertion on the part of the operator by using leverage and a gear. Although much larger arbor presses exist, the most commonly available arbor presses range from one half to five ton pressure rating. Most any tool supply house for the machining industry, tool industry and automotive industry sells arbor presses. Arbor presses are readily available most anywhere in the USA and are relatively inexpensive. Most importantly, arbor presses are more safe than power driven presses because the operator uses his or her hand to increase or decrease the pressure.

Figure 11:
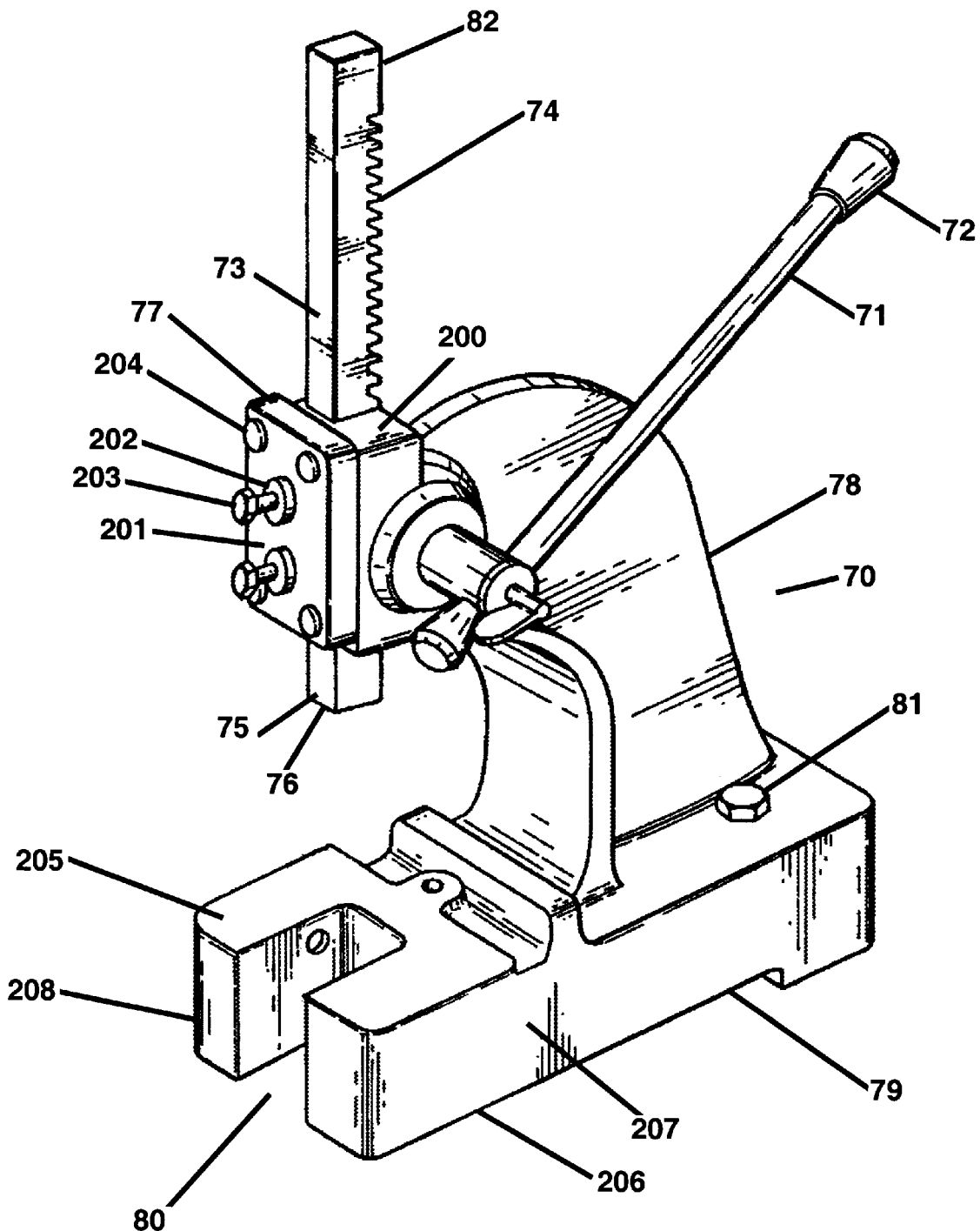
FIG. 11 shows an isometric view of a typical prior art arbor press that can be found at most tool supply distributors.

FIG. 11 shows a typical arbor press 70. A typical arbor press 70 has a handle 71 for manually exerting leverage pressure, and the handle has a rubber end 72 at each end. The arbor press 70 has a straight ram assembly 73 with gear teeth 74, a straight non-gear portion 75, a ram or hammer 76, and a top non-geared portion 82. The typical arbor press contains the straight ram assembly 73, a cap 77, handle 71, a neck 78, a base or support structure 79 with a base opening 80, a tightening bolt 81 to attach to the bench which goes through a bore (not shown) in the base 79. Prior art FIG. 11 shows that the ram guide 200 is attached to the neck 78 of the arbor press 70. The cap 77 is secured to the ram guide 200 using four holding bolts 204. The cap 77 secures the ram 73 in the ram guide 200. The tightness of the ram 73 inside the ram guide 200 is controlled by the tightness setting of the cap positioning bolt 203 which may be locked in position with the cap position lock nut 202. The base or support structure 79 has a top 205, a bottom or underside 206, a right side 207 and a left side 208. All structural portions are thick, especially the base 79 and the neck 78. There is one major flaw in these popular arbor press devices 70. The first flaw is that they are heavy. A ½ ton arbor press weighs over eight pounds. The second flaw is that arbor presses are designed for small parts. If the automotive industry uses the arbor press for press-fitting bearings, then they don't have to be capable of press-fitting long parts. The typical arbor press 70 limits in press-fit length are from the bottom of the cap 77 to the top of the base 79. However, the maximum part length is shorter yet because the figure does not show the metal piece that comes with most arbor presses to cover up the base opening 80 to enable press-fitting. By removing this metal cover of the base opening, parts may extend down to the workbench to gain another 2–3 inches in length of a part to be pressed with an arbor press 70. The only solution prior to this invention was to use a different kind of a press or use a larger arbor press. There is a large difference between a ½ ton arbor press and a 5 ton arbor press in cost and weight. There is not a large difference between a ½ ton arbor press and a 5 ton arbor press in length of a part to be pressed. Even so, why should a person or a company have to purchase an overpowered arbor press at great expense to do a small job just because an arbor press is too short. It is simply because arbor presses, which are mass produced to keep costs down, are not designed for applications outside the range of height simply because most users of arbor presses do not need to press a long part. Those that need to press a longer part are in the minority and must find an alternative that is not an arbor press. Inventor did not find an alternative, but instead made an extender device that attaches to an arbor press to increase the length of a part that may be pressed with an arbor press. However, the extender device 83 may also be installed in brand new arbor presses, or even cast into the arbor press and is not limited just what is described in this invention.

Figure 12:
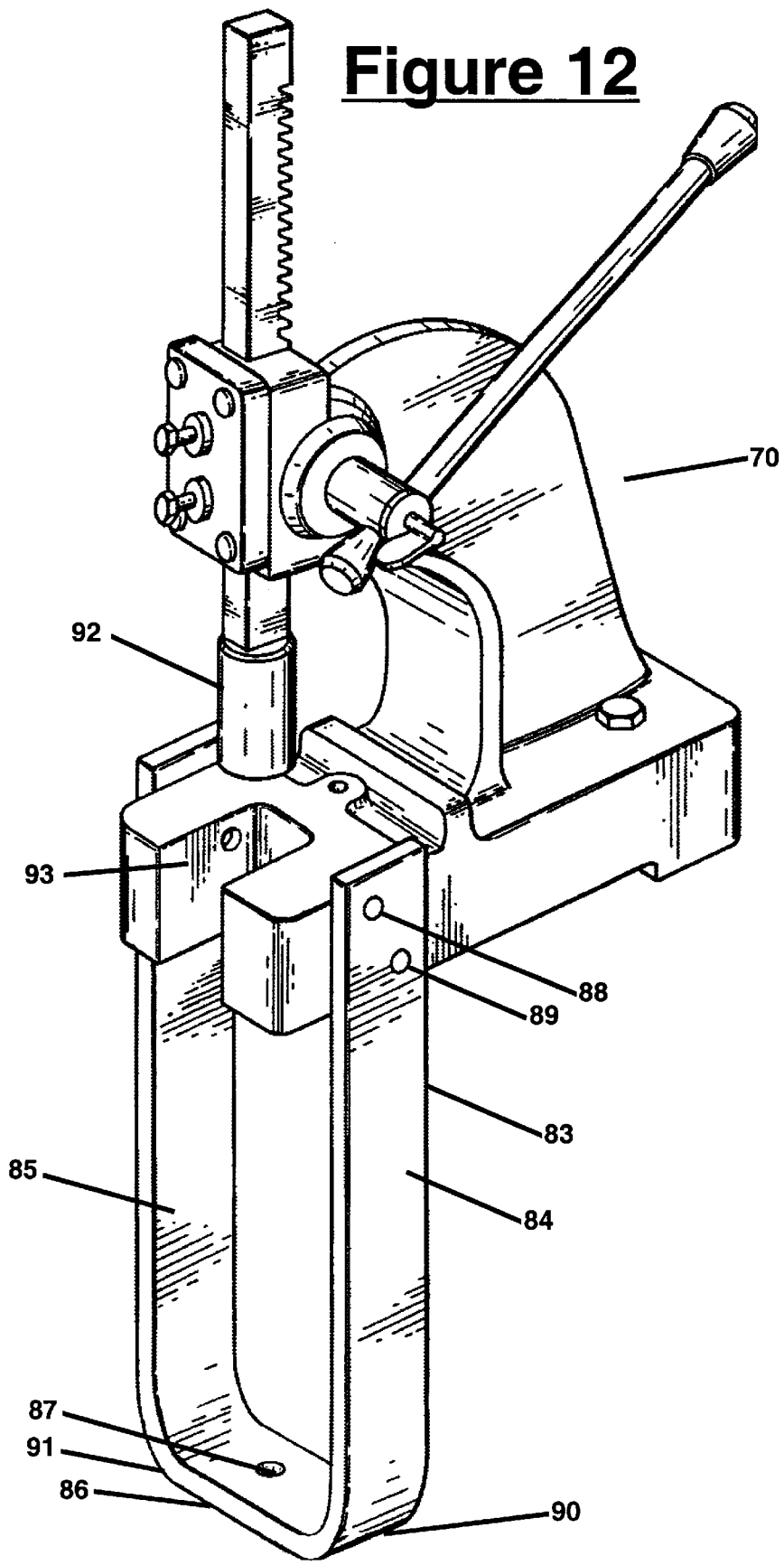
FIG. 12 shows an isometric view of an arbor press with the new extender added to the arbor press also showing the upper fixture holder module.
Figure 13:
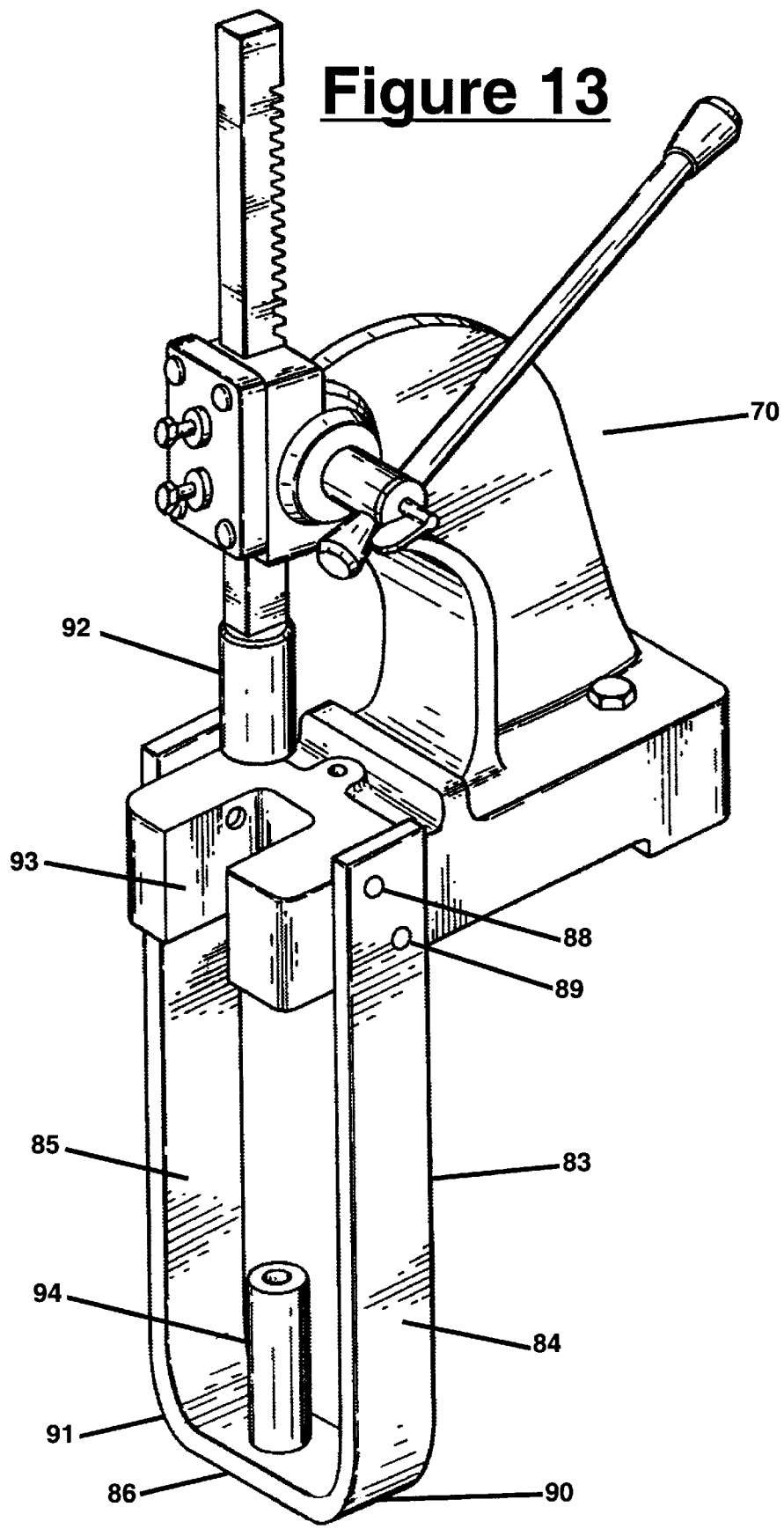
FIG. 13 shows an isometric view of an arbor press with the new extender added to the arbor press, also showing the top and bottom fixture holder modules.

FIG. 12 shows an arbor press with an extender assembly 83 used to increase the length of parts that may be pressed. The extender assembly 83 has a right leg 84 and a left leg 85, optionally a fixture attach bore 87 which may optionally be threaded, a base 86, a left bend 91, a right bend 90, and two attach holes 88 and 89. Alternately, and extender assembly may be made with multiple sets of attach holes 88 and 89 to make an extender assembly 83 with multiple length settings. The holes may be replaced with one or more slots that can be used to adjust the height of the extender. Holes are drilled and tapped into the base 79 of the arbor press 70 at holes 88 and 89 to enable the bolting attachment of the extender assembly 83 to the arbor press 70. There is an upper fixture holder module 92 on the ram 76 of the arbor press for attaching fixtures that position the parts to be pressed to insure that the press fit will be straight and proper. FIG. 13 shows the same modified arbor press with a lower fixture holder module 94 for holding a variety of fixtures for different applications, also to insure that the press fit will be straight and proper, used in tandem with the upper fixture holder module 92. Also shown in the figure is a inner surface 93 of the base opening region 80.

Figure 14:
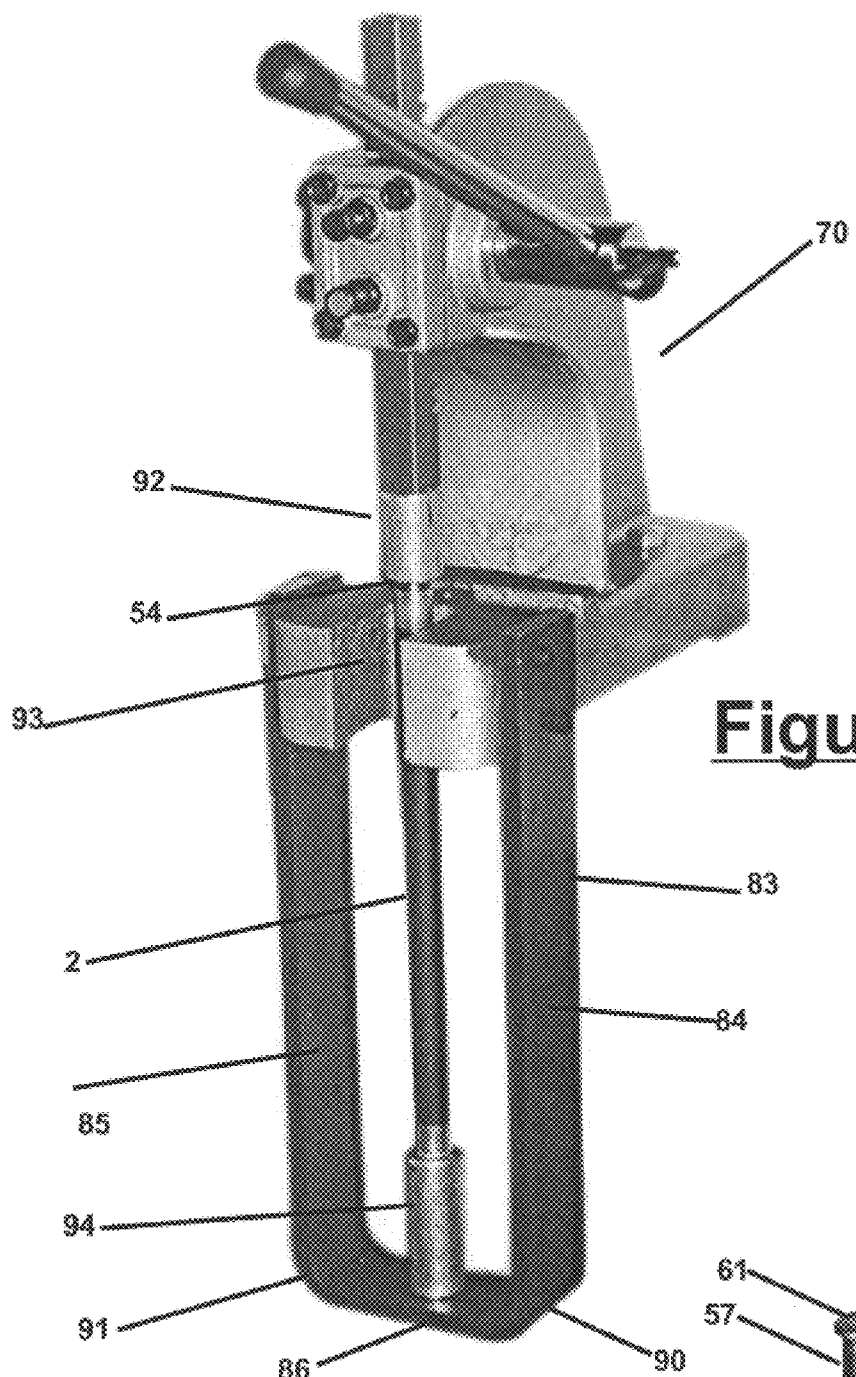
FIG. 14 shows an isometric view of an arbor press with the new extender added to the arbor press, also showing the top and bottom fixture holder modules with a developer and aftermarket contact in place.
Figure 15:
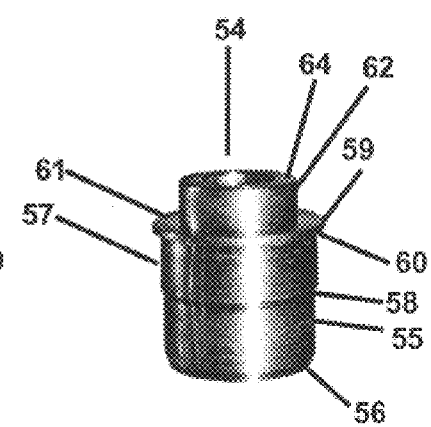
FIG. 15 is an isometric view of a new and improved aftermarket electrical contact.

FIG. 14 shows a laser printout of a digital image of the arbor press 70 with the extender assembly 83, the upper and lower fixture holder modules 92 and 94, a developer roller 2, and a press-fit contact 54 being press-fit. FIG. 15 shows a laser printout of a digital photo of the press-fit contact 54 that is used in FIG. 14 because this contact 54 is difficult to see in FIG. 14. This figure shows that even though the upper fixture holder module 92 and the lower fixture holder module 94 are meant to hold modular fixtures to firmly hold parts to be press-fit at top and bottom, the fixture holder modules 92 and 94 may also be used as fixtures as in FIG. 14. By causing the fixture holder module to be based on a widely used size, then all the fixture holders can fit into that size to economize on the number of fixtures required to fit into the fixture holders. Different embodiments of these fixtures will later be described.

The extender assembly 83 is actually very simple. Some of the best pioneer inventions are simple. The extender assembly 83 is comprised of flat bar cold rolled steel flat bar ⅜ inches thick and 1 and ¾ inch wide. The extender 83 has two right angle bends at 90 and 91. Other dimensions would also work. However, inventor will manufacture this with the above dimensions for strength purposes but does not want to limit invention to these dimensions. The extender assembly 83 should function properly with almost any dimensions as long as it increases the length of a part that an arbor press can press. The rubber hose may also be used in an upper or lower fixture to receive the part to be pressed.

FIGS. 16 and 17 show the upper fixture holder module 92 which has a small bore 95, a larger bore 96, a top 97, a bottom 98, a bore joining disk region 99, a top 100 of the smaller bore 95 and a bottom 101 of the larger bore 96. This fixture holder may be bolted through the bores 95 and 96 to the ram 76. It is easiest to use a bolt that may be tightened with an ALLEN wrench, the ALLEN wrench made to fit into the larger hole 96 to allow turning the bolt. Optionally, the small bore 95 may be tapped, however, it is easier to drill and tap a bore into the ram 76 to attach the upper fixture holder module 92.

FIGS. 18 and 19 show the lower fixture holder module 94 which has a small bore 102, a larger bore 103, a top 104, a bottom 105, a bore joining disk region 106, a bottom 105 of the smaller bore 102 and a top 107 of the larger bore 103 This fixture holder may be bolted from below the bottom 105 into the small bore 102, preferably threaded as shown in FIG. 19. The small bore 102 may be tapped to attach the lower fixture holder module 94 to the base 86 of the extender assembly 83 on an arbor press 70.

Figure 20:
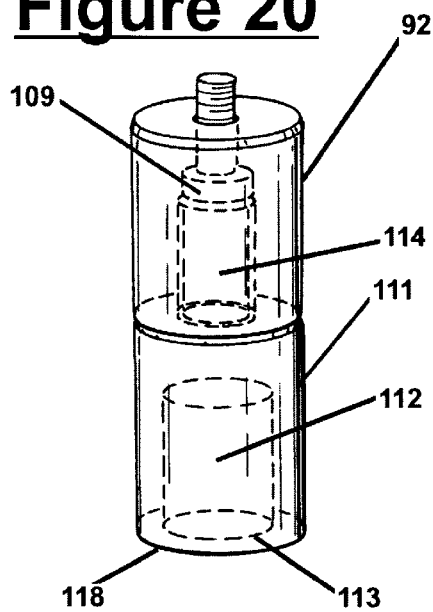
FIG. 20 is an isometric view of an upper fixture holder with a fixture module attached.
Figure 21:
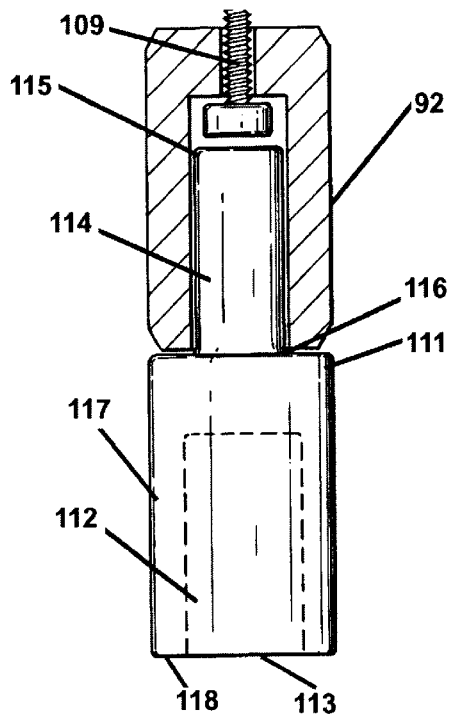
FIG. 21 is a cutaway view of an upper fixture holder with a fixture module attached.

FIGS. 20 and 21 show the upper fixture holder module 92 with an upper fixture 111 or tool fixture 111 or subfixture 111 attached from the bottom 98 of the upper fixture holder module 92 or fixture 92. A bolt 109 is shown to attach the upper fixture module 92 to the ram 76. The fixture 111 has a bore 112 to receive the end of any parts to be press-fit. The bore 112 has a bottom 113 where the press-fit part may be inserted. When the press-fit part is steel or other material that is attracted by a magnet, the fixture 111 may be made magnetic so the press-fit part can stay in by magnetism. One way to do this is to make the fixture 111 of steel and to magnetize it although the same may be done by using magnetite or magnetic steel. The fixture 111 has an upper fixture stem 114 and the stem 114 has a top 115. The fixture has a base 117 and a stem join base region 116, and a bottom 118 of the base 117. It is not just that the bore 112 is designed to "fit parts" as earlier stated, but some parts to be pressed may have protrusions that stick out and the bore 112 is designed to accomadate these protrusions as well as make a nice fit.

Figure 35:
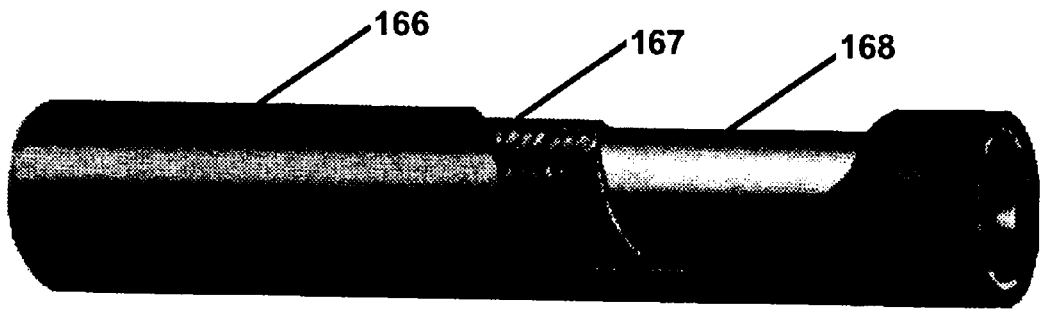
FIG. 35 is a digital photo showing a cutaway of a typical hose material.
Figure 36:
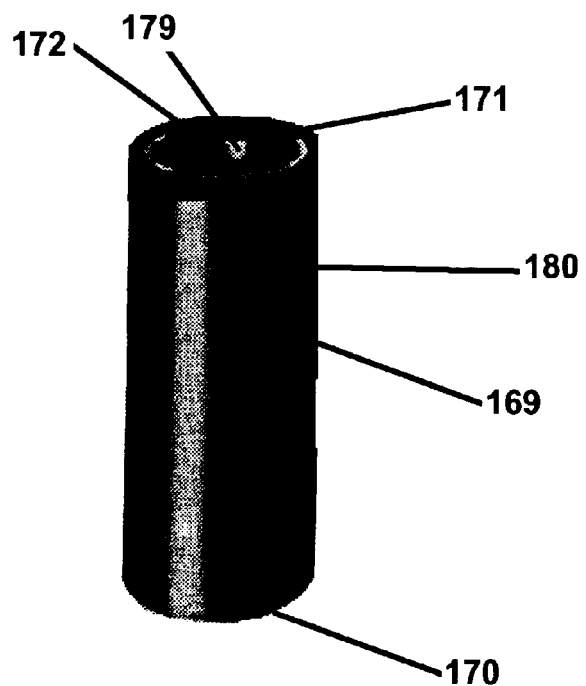
FIG. 36 shows a small piece of hose used to fit in the bore of a modular fixture holder for quick installation and removal of removable fixtures.

FIG. 35 shpws a typical rubber hose material 165. In this figure it has three layers 166, at the outer layer, 167 in the middle layer and 168 at the inner layer. FIG. 36 shows a hose 169 cut to length and designed to go into the larger bore 96 of the upper fixture holder module 92. With this hose positioned tightly in the larger bore and optionally glued, upper fixtures 111 may be quickly slipped in the bore 172 of the hose 169 by placing the stem 114 of the upper fixture 111 snugly in the hose's 169 bore 172 to fit snugly into the inner wall 179. This upper fixture 111 may be quickly installed and uninstalled when different fixtures 111 which are used for press-fitting different parts are required.

Figure 22:
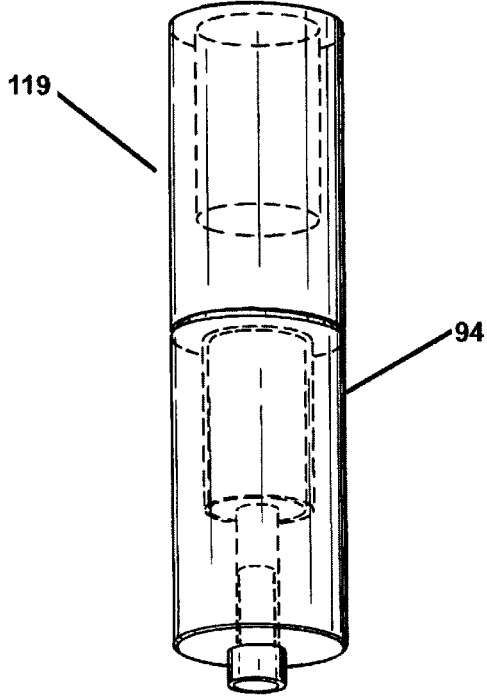
FIG. 22 is an isometric view of an lower fixture holder with a fixture module attached.
Figure 23:
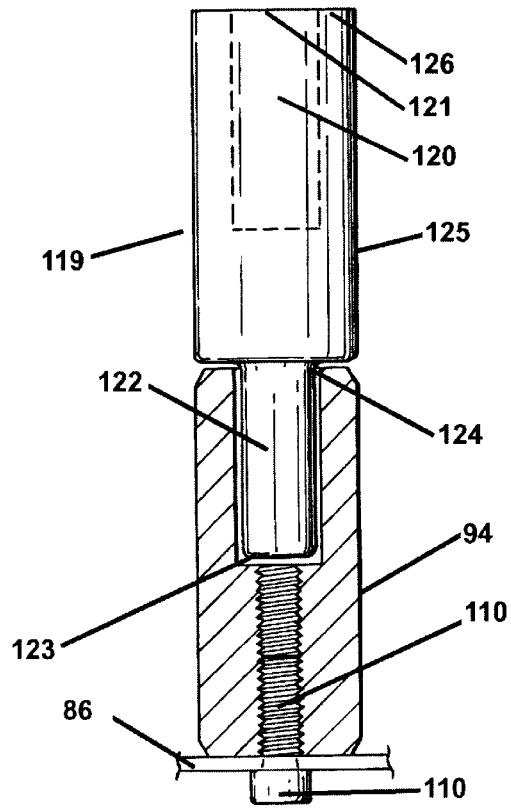
FIG. 23 is a cutaway view of an lower fixture holder with a fixture module attached.

FIGS. 22 and 23 show the lower fixture holder module 94 with a lower fixture 119 or tool fixture 119 or subfixture 119 attached to the top 104 of the lower fixture holder module 94 or fixture 94. A bolt 110 is shown to bolt the lower fixture module 94 to the base 86 of the extender assembly 83. The fixture 119 has a bore 120 to fit the end of any parts that stick out to be press-fit. The bore 120 has a top 121 where the press-fit part may be inserted. When the press-fit part is steel or other material that is attracted by a magnet, the fixture 119 may be made magnetic. One way to do this is to make the fixture 119 of steel and to magnetize it although the same may be done by using magnetite or magnetic steel. This might not be necessary since gravity will hold the component in, but it is an option. The fixture 119 has a lower fixture stem 122 that fits into the large bore 103 of the lower fixture holder module 94 and the stem 122 has a bottom 123 The fixture has a top 126 and a stem join base region 124.

The hose 169 may optionally fit in the larger bore 103 of the lower fixture holder in order to have a quick install and uninstall for the lower fixture 119 for changing fixtures quickly and effortlessly when press fitting different sized fixtures, for example, on a manufacturing production line. This is certainly quicker than bolting and unbolting components. Any type of hose may be used in this embodiment or other embodiments using hose. Single layer hose may be used, multilayered hose may be used, and any hose may be used, so long as it protects the surface of the developer roller 2 from scratching or other damage. For example, some of the hose materials that may be used are rubber, urethane, urethane rubber, air hose, water hose, cooling hose, automotive hose, air conditioning hose, compressed air hose, fishtank tubing, garden hose, hydraulic hose, neoprene rubber, hard rubber, soft rubber, closed cell foam, open cell foam, among many other hoses, tubes, rubber pipe, molded rubber or extruded rubber. There is no limit in possibilities in types of hoses and tubing to use for the quick connect feature in this and other embodiments. Please note that inventor invented a quick connect lathe adapter set for quickly installing and uninstalling lathe adapters for quick connect shown in U.S. Pat. Nos. 5,309,200 and 5,381,213.

FIGS. 24 and 25 show an upper fixture holder module 92 with an upper fixture 127 attached from the bottom 98 of the upper fixture holder module 92. A bolt 109 (not shown) may be used to bolt the upper fixture module 92 to the ram 76. The fixture 127 may optionally have a bore 129 to attach to the fixture holder 92 with a bolt or other fastener. The fixture 127 has a bottom 184 to be inserted into the press-fit part. For example, this is a male fixture 127 as opposed to the female upper fixture 111. The male fixture 127 may be used to press-fit a component that is female such as the contact 25 shown in FIGS. 4 and 5. The bottom 184 of the fixture 127 inserts into the contact's 25 first portion 28 and abuts against the contact surface 30 of the contact 25 which allows the the male fixture 127 to press-fit the contact 25. The same is true of this fixture for any female object to be press-fit in any industry whatsoever and is not limited to the imaging industry. When the press-fit part is steel or other material that is attracted by a magnet, the fixture 127 may be made magnetic so the press-fit part can stay in by magnetism. One way to do this is to make the fixture 127 of steel and to magnetize it although the same may be done by using magnetite or magnetic steel. The fixture 127 has an upper fixture stem 129 (top portion) which has a top 131. The fixture has a base 184 and a stem join base region 130. Although the male fixture 127 is shown as an upper fixture, there could also be a lower male fixture designed the same way but upside down and it would have all the same features, and thus it is hereby incorporated in this patent application by having described the upper fixture 127 to save space. Similarly, the upper fixture 127 may be installed using a hose on the inside bore of the fixture holder 92 and/or 94 so the fixture 127 may be installed and uninstalled quickly into either fixture holder 92 or 94.

Figure 28:
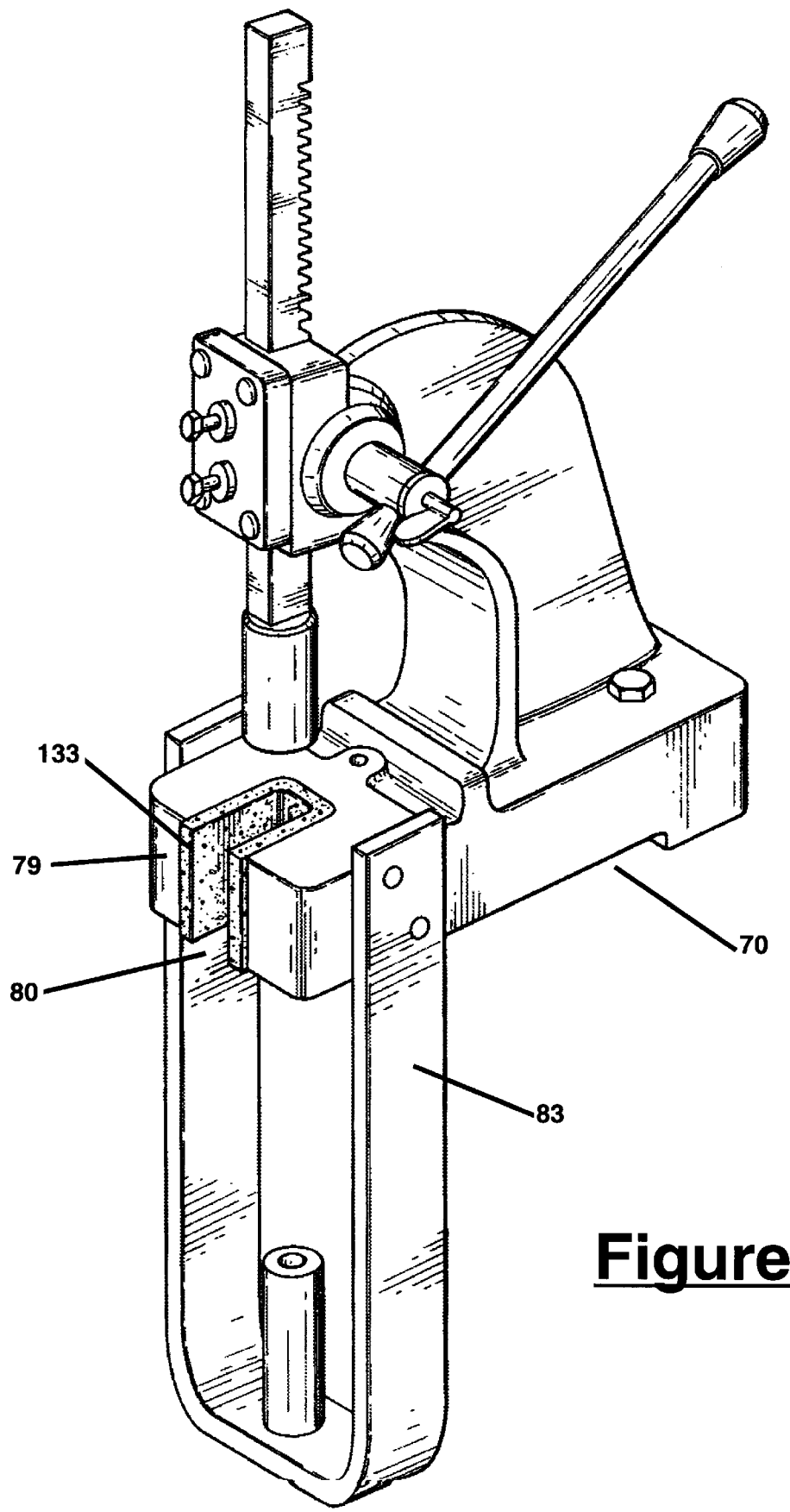
FIG. 28 shows an isometric view of an arbor press with foam in the arbor press opening to prevent the magnetic developer roller from getting damaged.

FIG. 26 shows an isometric cutaway view of the arbor press. When press-fitting developer rollers are placed in the narrow base opening 80 as in FIG. 14, since many developer rollers 2 are very magnetic by design, there is a tendency for the outer surface of the developer roller to strongly attract to the base 79 of the arbor press 70 at the inner surface 93 of the base opening region 80. It is this attraction that can easily score the sensitive surface of the developer roller 2 and cause a print defect. For this reason, some soft material 133 is inserted inside the base opening 80 to prevent damage to the developer roller 2. Many soft materials 133 may be used, for example, ester open cell foam, ether open cell foam, any open cell foam, closed cell foam, foam, rubber, foam rubber, cloth, cotton, fabric, wool, polyurethane, polyurethane foam, any open cell material, any closed cell material, any soft material, any cushiony material. If the poles are known on the developer rollers, like poled magnets may be used in place of the soft material 133 to repel the developer roller from touching the base opening 80. FIG. 27 shows a cutaway top view of the arbor press with the soft material 136 installed to protect the developer roller 2. FIG. 28 shows the arbor press 70 with the extender 83 and the installed soft protective material 133, in this case open cell ester foam. I like the ester foam best because my daughter's name is Esther.

Figure 29:
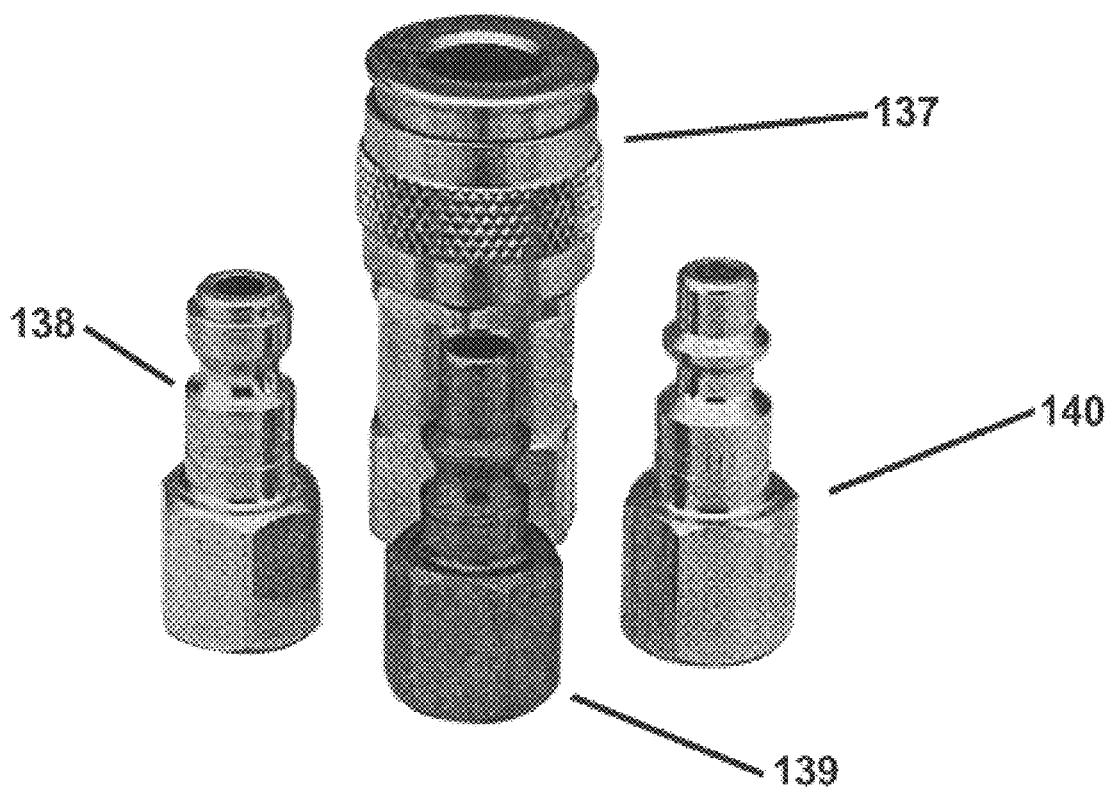
FIG. 29 shows a prior art universal quick connect coupler for making an air hose connection that is capable of receiving the three quick connect different style nipples in the figure.

FIG. 29 shows a prior art quick connect universal coupler 137, and three different quick connect nipples from the air hose (compressed air) industry. The three quick connect nipples are references 138, 139 and 140, each one different. The universal coupler 137 may be used by any of the nipples 138, 139 or 140, even though each nipple has a completely different design as seen in FIG. 29. There are many more designs of couplers too numerous to mention which are to be incorporated in this invention even though they are not all shown.

Figure 30:
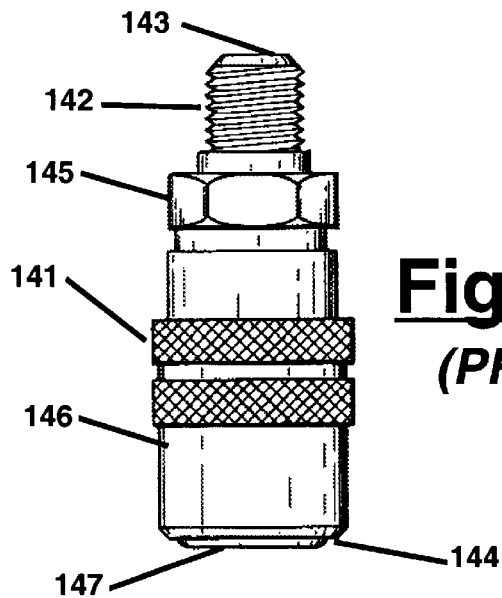
FIG. 30 is a prior art quick connect coupler with male pipe threads at the permanent/semi-permanent connection end.

FIG. 30 shows a typical quick connect coupler 141, different from the one previously shown. The quick connect coupler 141 has a male pipe thread 142 which is more suitable to the application of using a coupler 141 to replace the upper and lower fixture holders 92 and 94. By using a coupler 141 with a male thread 142, the coupler would install into the threaded bore 87 in the base 86 of the extender 83. By simply replacing the lower fixture holder module 94 with a coupler 141, a different quick connect embodiment may be made. The same is true of the upper fixture holder module 92. The coupler assembly 141 may also replace the upper fixture holder module 92 in the ram 76 of the arbor press 70 and the coupler assembly 141 may instead be installed in a hole drilled and taped in the ram 76.

Figure 31:
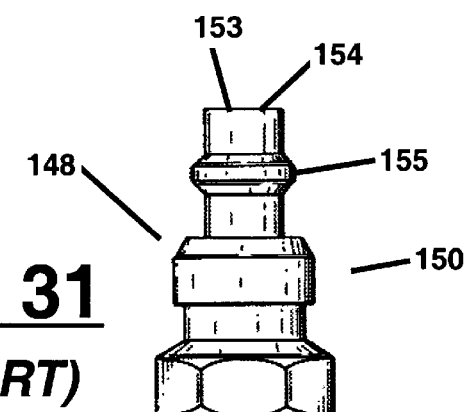
FIG. 31 shows a prior art quick connect nipple with male pipe threads at the permanent/sem-permanent connection end.
Figure 32:
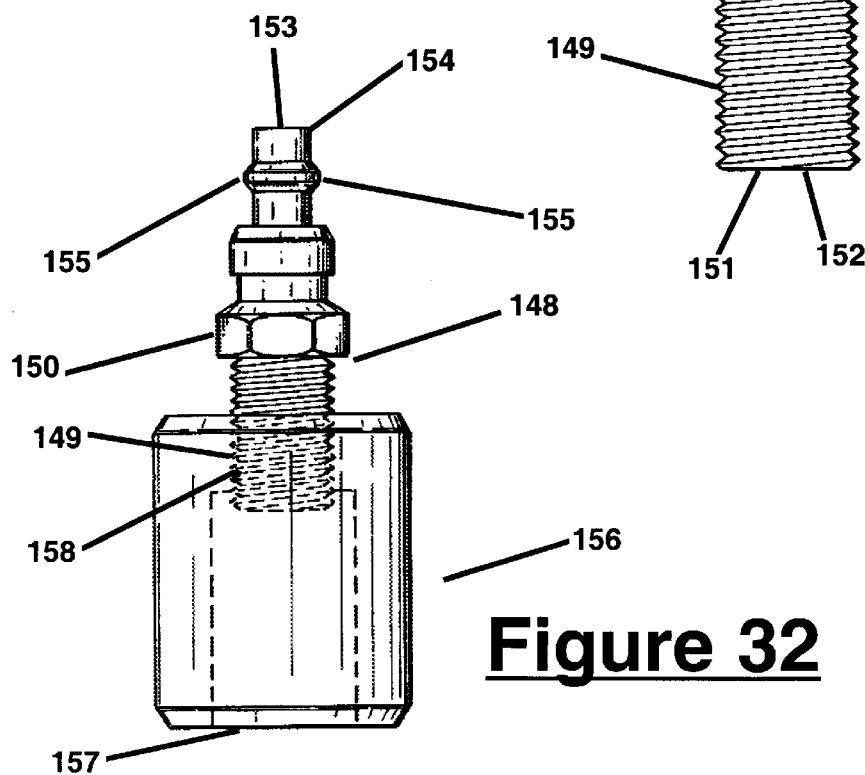
FIG. 32 shows a quick connect upper fixture holder using a coupler for quick connect features.

In order to use the couplers 137 or 141 as either upper or lower fixture holders, the upper and lower fixtures 111 and 119 must have a hole drilled and tapped in them to receive the male threads 149 of a nipple 148 as shown in FIG. 31. The nipple 148 has a male pipe thread to allow the nipple to screw into a tapped 24 hole in a quick connect fixture 156 as shown in FIG. 32. Please note that the figures show that the nipple 148 has a male thread 149, a hex wrench turn portion 150, a bottom end 151, a bottom bore 152, a top end 153, a top bore 154 and a nipple push lock 155. The coupler 141 has a male pipe thread 142, a thread end 143, a quick connect end 144, a hex-wrench turn portion 145, a sliding ring 146 and a bottom bore 147. The quick connect fixture 156 of FIG. 32 may be used either as an upper or lower fixture and has a first lower bore 157 and a second upper bore 158. The fixture 156 can quickly connect and disconnect from an upper or lower fixture holder 141 coupler (not shown in an arbor press), and a user can acquire a set of fixtures similar to 156, each of a different size and quickly plug them in and out of coupler fixture holders such as 141 located in an arbor press 70 ram 76 or on the threaded hole 87 of the base 86 of an extender 83 for quick changeover on a production line or any work environment.

Figure 33:
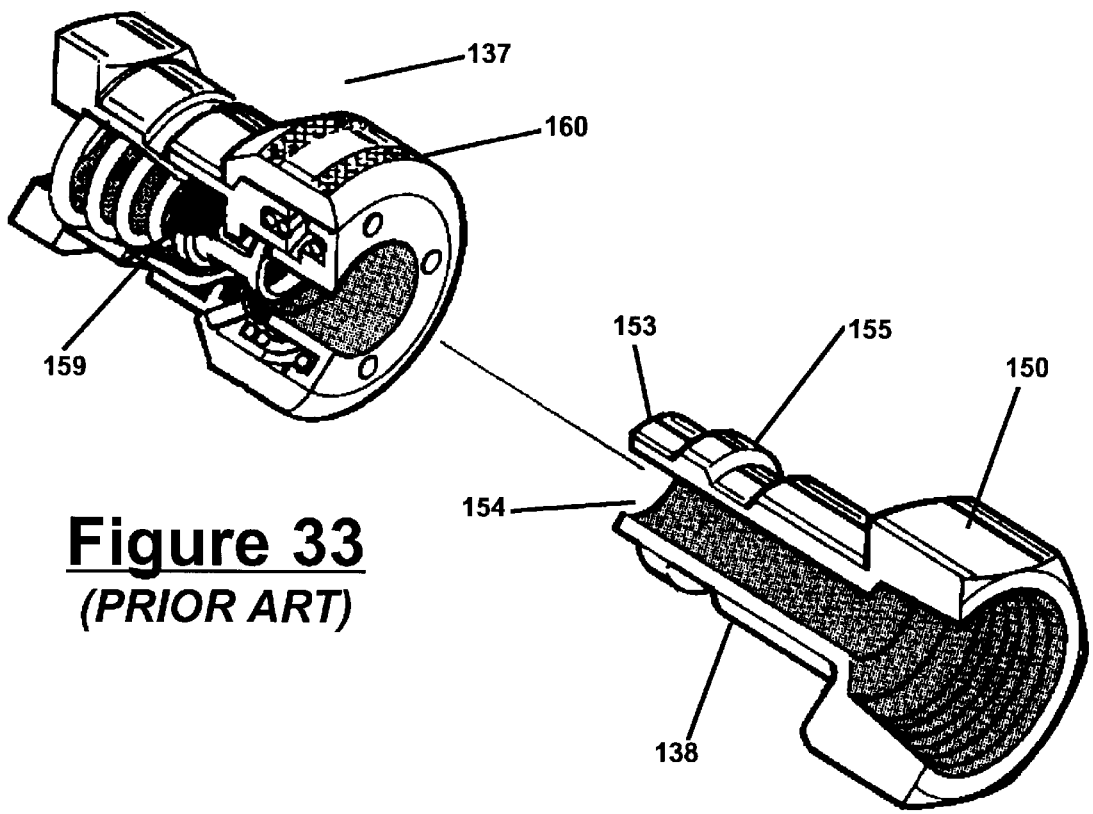
FIG. 33 shows a cutaway isometric view of a typical prior art quick connect coupling and nipple used for connection of air hoses.
Figure 34:
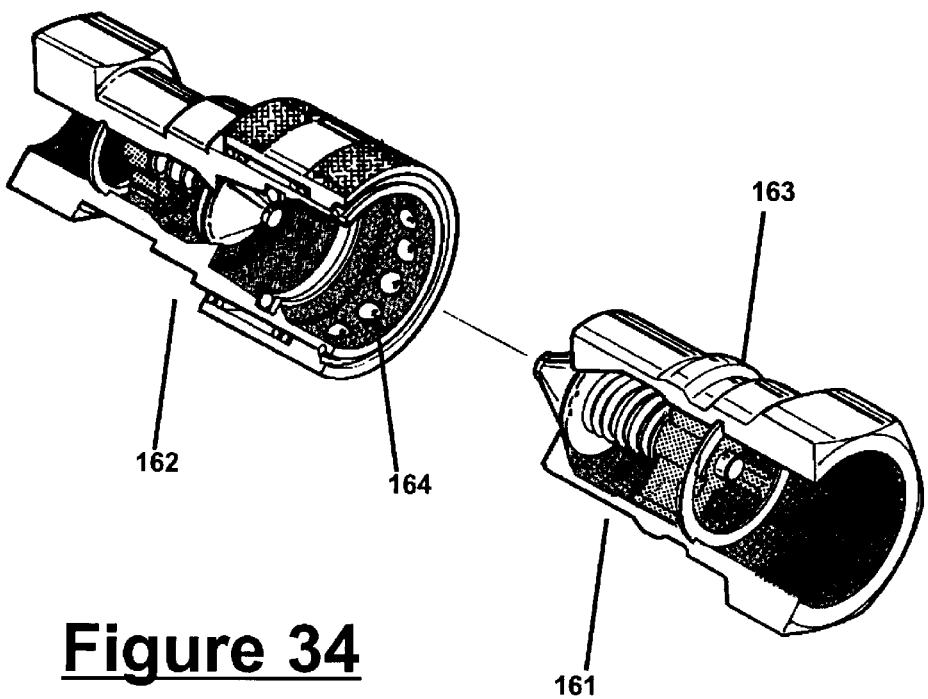
FIG. 34 shows a cutaway isometric view of a typical prior art quick connect coupling and nipple used for connection of hydraulic lines.

FIG. 33 shows a cutaway isometric view of a quick connect coupler 137 and a quick connect nipple 138. Shown in the figure on the nipple 138 is the hex wrench turn portion 150, the top end 153, the bore 154 in the top 153 and the nipple push lock 155. Shown in the figure on the coupler are the precision seal 159 and the knurl 160 for easy gripping. Of course, since the couplers are not used for a compressed air hose, the precision seal is not necessary. To use an existing coupler and nipple that is already equipped with unnecessary features relating to a pneumatic compressed air line does not hurt the performance of using the quick connect coupler and nipple solely for the quick connect features. FIG. 34 shows a cutaway isometric view of a coupler 162 and a nipple 161 from the hydraulic industry, used to quickly connect hydraulic lines. The hydraulic coupler 162 and nipple 161 may also be used similar to the pneumatic coupler 137 and nipple 138 as already described. The hydraulic coupler 162 has a ball locking mechanism 164. The hydraulic nipple 161 has a nipple push lock 163 to secure the nipple 161 into the coupler 162. Since minor changes and modifications varied to fit particular operating requirements and environments will be understood by those skilled in the art, the invention is not considered limited to the specific examples chosen for purposes of illustration. The invention includes all changes and modifications which do not constitute a departure from the true spirit and scope of this invention as claimed in the following claims and as represented by reasonable equivalents to the claimed elements. Any ideas shown in any embodiments may be incorporated into any other embodiments.

What is claimed is:

1. An extender for use with an arbor press, the arbor press having a support structure and a ram, in spaced relation, for manipulating a workpiece said extender comprising:
   a first portion having a first end adapted to be secured to the support structure of the arbor press, said first portion depending from the support structure away from the ram to a second end; and
   a second portion extending from said second end of said first portion;
   said second portion transverse to said first portion and being opposite the ram for supporting a workpiece.

2. An extender as set forth in claim 1 wherein said extender is bolted to an arbor press.

3. An extender for use with an arbor press, the arbor press having a support structure and a ram, in spaced relation, for manipulating a workpiece comprising:
   a first portion adapted to be supported at a first end by the support structure of the arbor press and to depend therefrom; and
   a second portion extending from said first portion at a second end of said first portion;
   said second portion being opposite the ram for supporting a workpiece wherein said first portion includes right and left legs with slots adapted to permit said extender to be adjusted relative to the support structure.

4. The extender as set forth in claim 1, wherein said second portion includes a lower fixture holder adapted to manipulate the workpiece.

5. An extender as set forth in claim 1 added to the arbor press to increase the length of a workpiece that may be pressed in the arbor press;
   whereby said extender has a right leg, a left leg and a base;
   whereby said right leg and left leg are secured to the support structure of the arbor press;
   and thereby attach said extender device to the arbor press.

6. An arbor press for manipulating a workpiece, said arbor press comprising:
   a support structure having first and second opposing sides;
   a ram assembly supported on said first side;
   said ram assembly being movable relative to said support structure for manipulating the workpiece; and
   an extender having a first portion supported on said support structure of said arbor press proximate a second side; and
   a base extending from said first portion for supporting a workpiece.

7. The arbor press as set forth in claim 6;
   wherein said ram assembly further includes an end with a hammer; and
   wherein the workpiece is manipulated between said hammer and said second portion.

8. An arbor press as in claim 6 whereby said extender is bolted to said arbor press.

9. An arbor press as in claim 8;
   wherein said first portion of said extender includes a right and left leg.

10. The arbor press as in claim 9;
    wherein said legs include upper portions that have slots; and
    thereby permit the length of said extender to be adjustable and accommodate workpieces of varying lengths.

11. An arbor press as set forth in claim 6 further including a handle for moving said ram assembly to engage the workpiece;
    whereby said extender may be used to increase the maximum length of the workpiece that may be pressed in said arbor press whereby;
    said extender has a right leg, a left leg and said base;
    whereby said right leg and said left leg are secured to said support structure of said arbor press;
    and thereby attach said extender portion to said arbor press.

12. An arbor press as in claim 6 further including at least one fixture attached to at least one of said ram assembly and said base of said extender.

13. An arbor press as in claim 12 wherein a first fixture is attached to said ram; and a second fixture is attached to said base of said extender.

14. An arbor press as in claim 13 wherein said fixtures are used as modules to hold subfixtures;

wherein said subfixtures are used to position the workpiece to be manipulated; and said fixture is used to position said subfixture.

15. An arbor press as in claim 14 wherein said fixtures and said subfixtures attach and detach from each other quickly so that workpiece style and length may be quickly changed to minimize downtime.

16. An arbor press as in claim 15 wherein said fixtures and said subfixtures use quick connect fittings for quick attachment and detachment.

17. An arbor press for manipulating a workpiece said arbor press comprising:

a support structure having first and second opposing sides;

a ram assembly supported on said first side;

said ram assembly being movable relative to said support structure for manipulating the workpiece; and an extender having a first portion supported on said support structure of said arbor press proximate a second side; and a base extending from said first portion for supporting a workpiece;

including at least one fixture attached to at least one of said ram assembly and said base of said extender;

wherein a first fixture is attached to said ram; and a second fixture is attached to said base of said extender;

wherein said fixtures are used as modules to hold subfixtures;

wherein said subfixtures are used to position the workpiece to be manipulated; and said fixture is used to position said subfixture;

wherein said fixtures and said subfixtures attach and detach from each other quickly so that workpiece style and length may be quickly changed to minimize downtime;

wherein said fixtures and said subfixtures use quick connect fittings for quick attachment and detachment;

wherein said quick connect fittings are couplings; and nipples not unlike the quick connect fittings used for quick connection in air compressor lines for quick connect and disconnect.

18. An arbor press for manipulating a workpiece, said arbor press comprising:

a support structure having first and second opposing sides;

a ram assembly supported on said first side;

said ram assembly being movable relative to said support structure for manipulating the workpiece; and an extender having a first portion supported on said support structure of said arbor press proximate a second side; and a base extending from said first portion for supporting a workpiece;

including at least one fixture attached to at least one of said ram assembly and said base of said extender;

wherein a first fixture is attached to said ram; and a second fixture is attached to said base of said extender;

wherein said fixtures are used as modules to hold subfixtures;

wherein said subfixtures are used to position the workpiece to be manipulated; and said fixture is used to position said subfixture;

wherein said fixtures and said subfixtures attach and detach from each other quickly so that workpiece style and length may be quickly changed to minimize downtime;

wherein said fixtures and said subfixtures use quick connect fittings for quick attachment and detachment;

wherein said quick connect fittings are couplings; and nipples not unlike the quick connect fittings used for quick connection in hydraulic hose lines for quick connect and disconnect.

19. An arbor press for manipulating a workpiece, said arbor press comprising:

a support structure, a neck attached to top of said support structure at a bottom of said neck, a ram guide attached to top of said neck;

a ram assembly disposed within said ram guide;

said ram assembly being movable relative to said support structure for manipulating the workpiece; and an extender having a first portion supported on said support structure; and a base extending from said first portion and aligned with said ram for supporting a workpiece.

20. An arbor press as set forth in claim 19;

wherein said ram assembly further includes an end with a hammer; and wherein the workpiece is manipulated between said hammer and said base.

21. An arbor press as in claim 19 whereby said extender is bolted to said arbor press.

22. An arbor press as in claim 21;

wherein said first portion of said extender includes a right and left leg bolted to said support structure and said base interconnecting said legs.

23. The arbor press as in claim 22;

wherein said legs include upper portions that have slots; and thereby permit the length of said extender to be adjustable and accommodate workpieces of varying lengths.

24. An arbor press as set forth in claim 19 further including a handle for moving said ram assembly to engage the workpiece;

whereby said extender may be used to increase the maximum length of the workpiece that may be pressed in said arbor press whereby;

said extender has a right leg, a left leg and said base;

whereby said right leg and said left leg are secured to said support structure of said arbor press;

and thereby attach said extender portion to said arbor press.

25. An arbor press as in claim 19 further including at least one fixture attached to at least one of said ram assembly and said base of said extender.

26. An arbor press as in claim 25 wherein a first fixture is attached to said ram; and a second fixture is attached to said base of said extender; and wherein said fixtures are used as modules to hold subfixtures; and wherein said subfixtures are used to position the workpiece to be manipulated; and said fixture is used to position said subfixture; and wherein said fixtures and said subfixtures attach and detach from each other quickly so that workpiece style and length may be quickly changed to minimize downtime; and wherein said fixtures and said subfixtures use quick connect fittings for quick attachment and detachment.

27. An arbor press as in claim 26 wherein said quick connect fittings are couplings; and nipples not unlike the quick connect fittings used for quick connection in air compressor lines for quick connect and disconnect.

28. An arbor press as in claim 26 wherein said quick connect fittings are couplings; and nipples not unlike the quick connect fittings used for quick connection in hydraulic hose lines for quick connect and disconnect.

* * * * *